United States Patent
Pedersen et al.

(10) Patent No.: US 11,847,172 B2
(45) Date of Patent: Dec. 19, 2023

(54) UNIFIED GRAPH REPRESENTATION OF SKILLS AND ACUMEN

(71) Applicant: AstrumU, Inc., Kirkland, WA (US)

(72) Inventors: Kaj Orla Peter Pedersen, Bellevue, WA (US); Xiao Cai, Redmond, WA (US); Ujash Suresh Patel, Renton, WA (US); Fedir Skitsko, Kharkov (UA); Adam Jason Wray, Medina, WA (US)

(73) Assignee: AstrumU, Inc., Kirkland, WA (US)

( * ) Notice: Subject to any disclaimer, the term of this patent is extended or adjusted under 35 U.S.C. 154(b) by 0 days.

(21) Appl. No.: 17/732,768

(22) Filed: Apr. 29, 2022

(65) Prior Publication Data

US 2023/0350952 A1    Nov. 2, 2023

(51) Int. Cl.
G06F 16/9038    (2019.01)
G06F 16/906    (2019.01)
G06F 16/901    (2019.01)

(52) U.S. Cl.
CPC ........ G06F 16/9038 (2019.01); G06F 16/906 (2019.01); G06F 16/9024 (2019.01)

(58) Field of Classification Search
CPC . G06F 16/9038; G06F 16/9024; G06F 16/906
See application file for complete search history.

(56) References Cited

U.S. PATENT DOCUMENTS

| | | | |
|---|---|---|---|
| 6,067,535 | A | 5/2000 | Hobson et al. |
| 6,199,062 | B1 | 3/2001 | Byrne et al. |
| 8,090,725 | B1 | 1/2012 | Cranfill |
| 8,103,679 | B1 | 1/2012 | Cranfill et al. |
| 8,375,026 | B1 | 2/2013 | Elliott et al. |

(Continued)

FOREIGN PATENT DOCUMENTS

| | | |
|---|---|---|
| WO | 03054727 A1 | 7/2003 |
| WO | 2020003325 A1 | 1/2020 |

OTHER PUBLICATIONS

Office Communication for U.S. Appl. No. 16/691,479 dated Mar. 2, 2020, pp. 1-22.

(Continued)

*Primary Examiner* — Irete F Ehichioya
*Assistant Examiner* — Xiaoqin Hu
(74) *Attorney, Agent, or Firm* — John W. Branch; Branch Partners PLLC

(57) ABSTRACT

Embodiments are directed to managing data for unified graph representation of skills and acumen. Information associated with one or more subjects may be classified to provide profile information that conforms to a unified schema. Fields of the profile information may be classified as facts, fact-relationships, actions, skills, or skill-relationships based on the unified schema. A plurality of profile graphs may be generated based on map models and the facts, the fact-relationships, the actions, the skills, or the skill-relationships such that the map models include one or more directives for associating the facts, the fact-relationships, the actions, the skills, or the skill-relationships with one or more nodes or one or more edges in the plurality of profile graphs. In response to query information provided by one or more analysis applications, classifying a portion of the plurality of profile graphs based on the query information.

24 Claims, 15 Drawing Sheets

(56) References Cited

U.S. PATENT DOCUMENTS

| | | | |
|---|---|---|---|
| 8,688,694 | B2 | 4/2014 | Dexter |
| 8,943,062 | B2 | 1/2015 | Baumgartner et al. |
| 9,529,863 | B1* | 12/2016 | Gindin .................. G06Q 40/00 |
| 9,535,963 | B1* | 1/2017 | Shankar ................ G06F 16/337 |
| 9,849,388 | B2 | 12/2017 | Cohen et al. |
| 10,230,701 | B2 | 3/2019 | Ullrich et al. |
| 10,610,792 | B2 | 4/2020 | Adekunle et al. |
| 10,789,755 | B2 | 9/2020 | Amer et al. |
| 11,227,240 | B2 | 1/2022 | Cohen et al. |
| 11,250,721 | B2 | 2/2022 | Angel et al. |
| 11,429,893 | B1 | 8/2022 | Tong |
| 2002/0055870 | A1 | 5/2002 | Thomas |
| 2002/0059228 | A1 | 5/2002 | McCall et al. |
| 2004/0236598 | A1 | 11/2004 | Thomsen |
| 2005/0080656 | A1 | 4/2005 | Crow et al. |
| 2005/0239032 | A1 | 10/2005 | Hartenberger |
| 2006/0229896 | A1 | 10/2006 | Rosen et al. |
| 2006/0265436 | A1 | 11/2006 | Edmond et al. |
| 2006/0271421 | A1 | 11/2006 | Steneker et al. |
| 2007/0082324 | A1 | 4/2007 | Johnson et al. |
| 2007/0106811 | A1 | 5/2007 | Ryman |
| 2008/0155588 | A1 | 6/2008 | Roberts et al. |
| 2010/0057659 | A1 | 3/2010 | Phelon et al. |
| 2010/0125475 | A1 | 5/2010 | Twyman |
| 2010/0145729 | A1 | 6/2010 | Katz |
| 2011/0177483 | A1 | 7/2011 | Needham et al. |
| 2011/0238591 | A1 | 9/2011 | Kerr et al. |
| 2012/0022906 | A1 | 1/2012 | Snyder et al. |
| 2012/0208166 | A1 | 8/2012 | Ernst et al. |
| 2013/0275446 | A1 | 10/2013 | Jain et al. |
| 2013/0281798 | A1 | 10/2013 | Rau et al. |
| 2013/0291098 | A1* | 10/2013 | Chung .................. G06F 21/577 726/21 |
| 2014/0089219 | A1 | 3/2014 | Mathews |
| 2014/0172732 | A1 | 6/2014 | Baladi |
| 2014/0272889 | A1 | 9/2014 | Kulkarni et al. |
| 2015/0088793 | A1 | 3/2015 | Burgess et al. |
| 2015/0140526 | A1 | 5/2015 | Marino et al. |
| 2015/0242979 | A1 | 8/2015 | Abts |
| 2015/0310393 | A1 | 10/2015 | Bhaskaran et al. |
| 2015/0317754 | A1 | 11/2015 | Goel et al. |
| 2015/0379454 | A1 | 12/2015 | Polli et al. |
| 2016/0217701 | A1 | 7/2016 | Brown et al. |
| 2016/0352760 | A1 | 12/2016 | Mrkos et al. |
| 2016/0379170 | A1 | 12/2016 | Pande |
| 2017/0024701 | A1 | 1/2017 | Tang et al. |
| 2017/0076244 | A1* | 3/2017 | Bastide .............. G06Q 50/2057 |
| 2017/0109448 | A1 | 4/2017 | Adamy et al. |
| 2017/0213179 | A1* | 7/2017 | Schissel ................ H04L 67/306 |
| 2017/0213190 | A1 | 7/2017 | Hazan |
| 2017/0243163 | A1 | 8/2017 | Vootkur |
| 2017/0293841 | A1 | 10/2017 | McAllister et al. |
| 2017/0323211 | A1 | 11/2017 | Bencke et al. |
| 2017/0323233 | A1 | 11/2017 | Bencke et al. |
| 2018/0039946 | A1 | 2/2018 | Bolte et al. |
| 2018/0046623 | A1* | 2/2018 | Faith ...................... G06Q 10/00 |
| 2018/0144253 | A1 | 5/2018 | Merhav et al. |
| 2018/0157995 | A1 | 6/2018 | O'Malley |
| 2018/0225593 | A1 | 8/2018 | Cozine et al. |
| 2018/0293327 | A1 | 10/2018 | Miller et al. |
| 2018/0300755 | A1 | 10/2018 | Rohilla et al. |
| 2019/0102700 | A1 | 4/2019 | Babu et al. |
| 2019/0108217 | A1 | 4/2019 | Chen |
| 2019/0122161 | A1 | 4/2019 | Cicio, Jr. |
| 2019/0151758 | A1 | 5/2019 | Anglin et al. |
| 2019/0180098 | A1 | 6/2019 | Carpenter et al. |
| 2019/0279159 | A1 | 9/2019 | Cleaver et al. |
| 2019/0378050 | A1* | 12/2019 | Edkin .................... G06N 20/20 |
| 2020/0211041 | A1 | 7/2020 | Raudies et al. |
| 2020/0302296 | A1 | 9/2020 | Miller |
| 2020/0394592 | A1 | 12/2020 | Shi et al. |
| 2021/0256310 | A1 | 8/2021 | Roberts et al. |
| 2021/0279668 | A1 | 9/2021 | Mikhajlov |
| 2021/0334921 | A1 | 10/2021 | Austin et al. |
| 2022/0156866 | A1 | 5/2022 | Dua et al. |
| 2022/0245487 | A1 | 8/2022 | Shen et al. |
| 2022/0375015 | A1 | 11/2022 | Botteril et al. |
| 2023/0039710 | A1 | 2/2023 | Moore et al. |

OTHER PUBLICATIONS

Office Communication for U.S. Appl. No. 16/691,479 dated Jun. 25, 2020, pp. 1-26.

Office Communication for U.S. Appl. No. 16/898,177 dated Jul. 22, 2020, pp. 1-12.

Office Communication for U.S. Appl. No. 16/691,479 dated Sep. 11, 2020, pp. 1-6.

Office Communication for U.S. Appl. No. 16/898,177 dated Nov. 2, 2020, pp. 1-13.

Patel, Kayur et al., "Using Multiple Models to Understand Data," In Proceedings of the Twenty-Second International Joint Conference on Artificial Intelligence—vol. Two (IJCAI'11), AAAI Press, Jul. 2011, 1723-1728.

Office Communication for U.S. Appl. No. 16/898,177 dated Feb. 2, 2021, pp. 1-5.

Ludwigsen, Scott, "What Is Localization, And When Do You Need It?," Feb. 21, 2018, retrieved at: https://blog.languageline.com/what-is-localization, pp. 1-5.

Office Communication for U.S. Appl. No. 17/107,760 dated Feb. 8, 2021, pp. 1-35.

Office Communication for U.S. Appl. No. 16/691,479 dated Feb. 19, 2021, pp. 1-26.

Office Communication for U.S. Appl. No. 16/898,177 dated Feb. 23, 2021, pp. 1-9.

Office Communication for U.S. Appl. No. 17/107,760 dated May 20, 2021, pp. 1-8.

Office Communication for U.S. Appl. No. 16/691,479 dated Jun. 10, 2021, pp. 1-36.

Dillenberger, Donna N. et al., "Blockchain Analytics and Artificial Intelligence," IBM Journal of Research and Development, 2019, pp. 1-13.

Office Communication for U.S. Appl. No. 16/898,177 dated Jun. 18, 2021, pp. 1-11.

Office Communication for U.S. Appl. No. 16/898,177 dated Sep. 1, 2021, pp. 1-16.

Office Communication for U.S. Appl. No. 17/385,054 dated Nov. 19, 2021, pp. 1-41.

Office Communication for U.S. Appl. No. 17/384,577 dated Nov. 26, 2021, pp. 1-31.

Office Communication for U.S. Appl. No. 17/492,527 dated Jan. 18, 2022, pp. 1-11.

"More Than 80 New Products Will be Showcased at Next Week's HR Technology Conference & Exposition®," NoticiasFinancieras, Miami, Oct. 2017, pp. 1-7.

Office Communication for U.S. Appl. No. 17/384,577 dated Mar. 22, 2022, pp. 1-32.

Office Communication for U.S. Appl. No. 17/385,054 dated Mar. 28, 2022, pp. 1-43.

Office Communication for U.S. Appl. No. 17/587,413 dated Apr. 7, 2022, pp. 1-27.

Office Communication for U.S. Appl. No. 17/492,527 dated Apr. 29, 2022, pp. 1-12.

Office Communication for U.S. Appl. No. 17/587,413 dated Nov. 1, 2022, pp. 1-5.

Office Communication for U.S. Appl. No. 17/888,920 dated Nov. 16, 2022, pp. 1-22.

Office Communication for U.S. Appl. No. 17/587,413 dated Nov. 22, 2022, pp. 1-24.

Office Communication for U.S. Appl. No. 17/587,413 dated Aug. 9, 2022, pp. 1-31.

Office Communication for U.S. Appl. No. 17/385,054 dated Oct. 18, 2022, pp. 1-48.

Yanes, Nacim et al., "A Machine Learning-Based Recommender System for Improving Students Learning Experiences," IEEE Access, Nov. 2020, vol. 8, pp. 201218-201235.

(56) References Cited

OTHER PUBLICATIONS

Alshanqiti, Abdullah et al., "Predicting Student Performance and Its Influential Factors Using Hybrid Regression and Multi-Label Classificiation," IEEE Access, Nov. 2020, vol. 8, pp. 203827-203844.
Gonzalez, Avelino J. et al., "Automated Exercise Progression in Simulation-Based Training," IEEE Transactions on Systems, Man, and Cybernetics, Jun. 1994, vol. 24, No. 6, pp. 863-874.
Office Communication for U.S. Appl. No. 17/384,577 dated Jun. 13, 2022, pp. 1-5.
Office Communication for U.S. Appl. No. 17/385,054 dated Jun. 20, 2022, pp. 1-5.
Office Communication for U.S. Appl. No. 17/384,577 dated Jul. 11, 2022, pp. 1-31.
Office Communication for U.S. Appl. No. 17/492,527 dated Jul. 15, 2022, pp. 1-9.
Office Communication for U.S. Appl. No. 17/384,577 dated Nov. 25, 2022, pp. 1-29.
Office Communication for U.S. Appl. No. 17/385,054 dated Jan. 30, 2023, pp. 1-13.
Office Communication for U.S. Appl. No. 17/888,920 dated Mar. 10, 2023, pp. 1-24.
Office Communication for U.S. Appl. No. 17/587,413 dated Mar. 20, 2023, pp. 1-25.
Office Communication for U.S. Appl. No. 17/385,054 dated Apr. 6, 2023, pp. 1-4.
Office Communication for U.S. Appl. No. 18/091,698 dated Apr. 20, 2023, pp. 1-47.
Office Communication for U.S. Appl. No. 17/888,920 dated May 16, 2023, pp. 1-4.
Office Communication for U.S. Appl. No. 17/587,413 dated May 18, 2023, pp. 1-5.

* cited by examiner

UNIFIED GRAPH REPRESENTATION OF SKILLS AND ACUMEN

TECHNICAL FIELD

The present invention relates generally to data management, and more particularly, but not exclusively, to organizing data to evaluate skills and acumen for quantifying the efficacy of actions taken to reach educational goals.

BACKGROUND

Identifying persons that make good employees has long been a goal of organizations. And, in today's highly competitive global market, finding and keeping great employees is becoming more challenging. Conventionally, organizations may be forced to rely on narrow or limited criteria derived from anecdotal evidence, personal preferences, gut feelings, or the like, rather than evidence based analytics to determine if a person may be a good employee candidate. Similarly, educational institutions may want to provide educational opportunities that provide their students desirable employment opportunities. Accordingly, in some cases, educational institutions may design offerings based on their perception of the needs of desirable employers. But, not unlike employers, educational institutions may have limited access to evidence based analytics to help them design their offerings. Further, students may seek out educational institutions that to prepare them for careers with desirable employers. However, similar to employers and educational institutions, students (or potential students) have limited access to evidence based analytics to help them select educational institutions, education/training programs, or employers. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
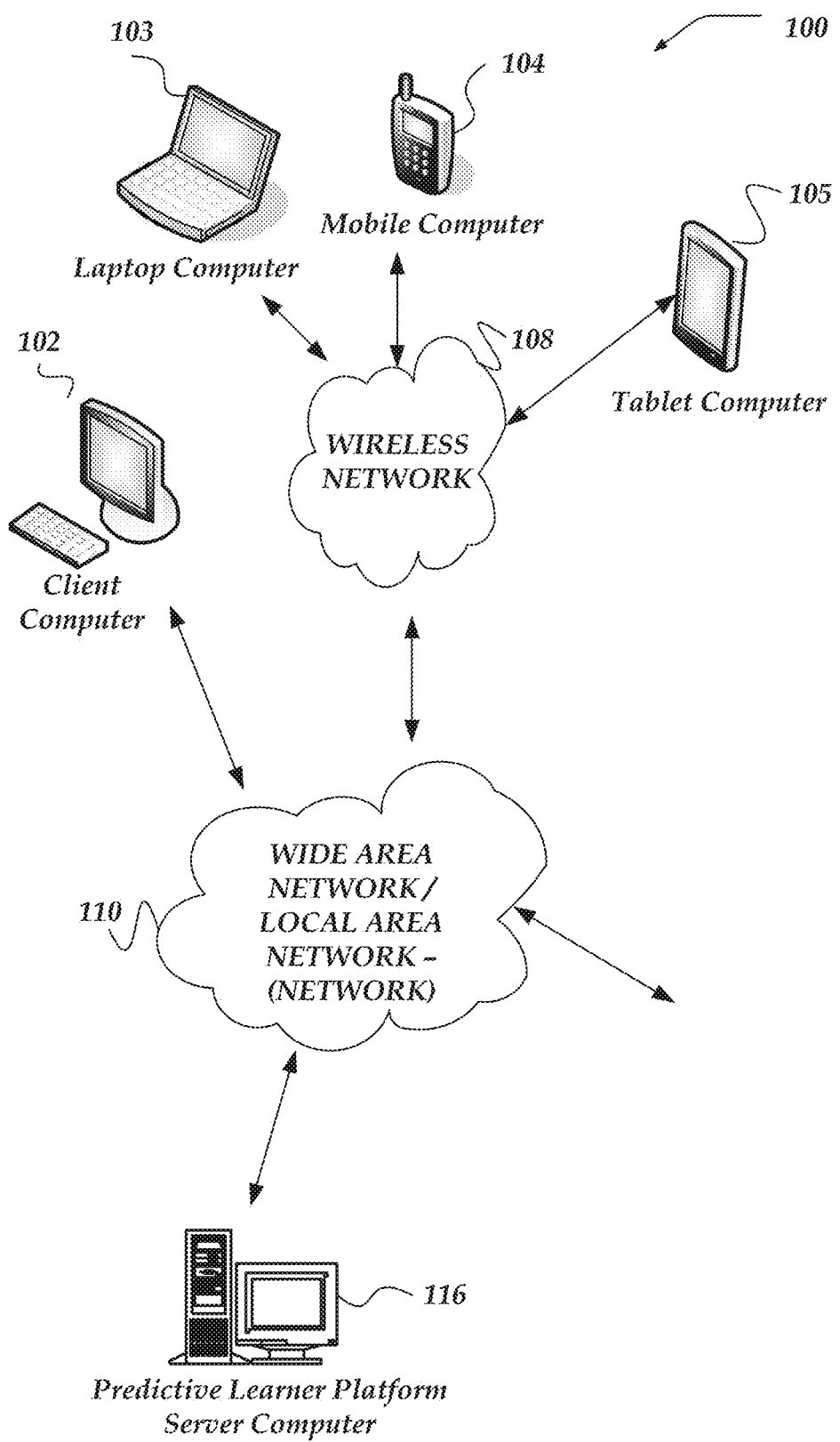
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances data sources may be public or private websites or other public or private repositories that enable third parties to access hosted content.

As used herein the term "raw data source" refers to a data source that generally provides its data as is, or otherwise with little coordination with a data ingestion platform. In most cases, raw data sources provide data that may require additional parsing or processing before it is usable by a data ingestion platform.

As used herein the term "integrated data source" refers to a data source that enables closer coordination with a data ingestion platform. In some cases, the data provided by an integrated data source may be formatted or otherwise configured to facilitate its use by a data ingestion platform.

As used herein the term "raw data" refers to data provided by a raw data source. Raw data may include structured or unstructured data, documents, streams, or the like. Provided data may be considered as raw because the data source may provide the data in a form or format "as-is."

As used herein the term "integrated data" refers to data provided by an integrated data source. Similar to raw data, integrated data may include structured or unstructured data, documents, streams, or the like. However, the provided data may be considered integrated data rather than raw because the data source may be arranged or configured to provide the data in a form or format that is consistent with one or more requirements of a data ingestion platform. Also, in some cases, integrated data may include information presumed to represent truths, such as, government or standard based codes, demographic information, or the like.

As used herein the term "categorization model" refers one or more data structures that encapsulate the data, rules, machine learning models, machine learning classifiers, or instructions that may be employed to associate raw data with a raw data category. Categorization models may include various components, such as, one or more machine learning based classifiers, heuristics, rules, pattern matching, conditions, or the like, that may be employed to assign data to a category. In some cases, categorization models may provide confidence scores that represent the quality of the categorizations. In some cases, categorization engines may employ one or more categorization models to categorize incoming raw data assets. For example, category models may be employed to determine if a document is a student transcript, resume, job listing, job description, course description, course catalog, or the like.

As used herein the term "translation model" refers one or more data structures that encapsulate the data, rules, machine learning models, machine learning classifiers, or instructions that may be employed to match or map information included in raw data assets to a unified schema. Translation models may include various components, such as, one or more machine learning based classifiers, heuristics, rules, pattern matching, conditions, or the like, that may be employed to match or map information in raw data assets to a unified schema. In some cases, translation models may provide confidence scores that represent the quality of the matches. Different translation models may be provided for different categories of raw data assets. For example, one translation model may be directed to translating information included in course descriptions while another translation model may be directed to translating information included in resumes. Likewise, in some cases, one translation model may be arranged to match information for more than one category of raw data. Also, in some cases, more than one translation model may be arranged to match the same category of data.

As used herein the term "profile model" refers one or more data structures that encapsulate the data, rules, or instructions that may be employed to generate profiles based on the ingested data. For example, a profile model may include rules or instructions for generating a student profile from ingested data.

As used herein the term "unified schema" refers a data schema that may be used to define the entities, fields, or attributes of a common data store. Information included in raw data may be matched to entities, fields, or attributes defined by a unified schema.

As used herein the term "unified fact" refers to one or more data structures or records that include values that conform to a unified schema. Information included in raw data may be mapped to unified facts that conform to a unified schema.

As used herein the term "subject" refers to an entity, such as, a user, student, employee, organization, person, or the like. Various information included in some raw data may be associated with one or more subjects.

As used herein the term "subject fact" refers to one or more data structures, values, or records that represent unified facts that are owned or associated with a subject. Subject facts may often be information that may be considered personally identifiable information. For example, ingested information that is associated with an individual student, such as, name, address, course of study, transcripts, grades, or the like, may be considered subject facts.

As used herein the term "non-subject fact" refers to one or more data structures, values, or records that represent unified facts that are not considered sensitive or otherwise directly associated with a subject. In some cases, non-subject facts may be derived or computed from subject facts. For example, federal job codes may be considered non-subject facts. Also, for example, aggregate data, such as, average student body grade point average, course of study distribution information, or the like, may be considered non-subject data.

As used herein the term "profile" refers to one or more data structures or records gathered together to provide information about a subject. For example, a student profile may include various information that are relevant to a particular student.

As used herein the term "profile graph" refers to one or more data structures that provide a graph or graph-like representation of a profile. Further, in some embodiments, profile graphs may be augmented with other information or format information from one or more other sources.

As used herein the term "map model" refers to one or more data structures that represent or include one or more directives that may declare how some or all information in a profile may be translated into profile graphs.

As used herein the term "fact" refers to information in profiles that may represent an objective value associated with a profile. In some cases, facts may include information such as addresses, age, names, position/role, employer, college, university, degree program/course of study, industry, or the like. Facts may be represented by nodes in profile graphs.

As used herein the term "fact-relationship" refers to information in profiles that may define a relationship between facts. For example, a fact may be a subject's role in an organization, whereas a fact-relationship may be a 'reports-to' relationship that links the subject (a fact) in an organization to another person (another fact). Fact-relationships may be represented as edges in profile graphs.

As used herein the term "action" refers to the actual or proposed activity that results in the gaining of one or more skills. For example, the action of taking-a-course-to-learn-the-computer-programming-language-python may result in one or more skills such as python programming, general programming, or the like. Actions may be represented as edges in profile graphs while the resultant skills may correspond to nodes.

As used herein the term "skill" refers to learned or inherent assignments or assessments of competency in the performance in various tasks or activities. In some cases, skills may be categorized as hard skills or soft skills. Hard skills may represent learned skills that may be associated with competencies in performing specific activities that may be often technical or job specific activities. Soft skills may represent interpersonal or behavioral skills, such as, communication, teamwork, leadership, or the like.

As used herein the term "skill-relationship" refers to a linkage between two or more skills. Skill-relationships represent how obtaining a specific skill may convey one or more related skills. Accordingly, skill-relationships may be edges in profile graphs that represent links among related skills.

As used herein the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data for unified graph representation of skills and acumen. In one or more of the various embodiments, ingested information associated with one or more subjects may be classified to provide profile information that conforms to a unified schema.

In one or more of the various embodiments, one or more fields of the profile information may be classified as one or more facts, one or more fact-relationships, one or more actions, one or more skills, or one or more skill-relationships based on the unified schema.

In one or more of the various embodiments, a plurality of profile graphs may be generated based on one or more map models and the one or more facts, the one or more fact-relationships, the one or more actions, the one or more skills, or the one or more skill-relationships such that the one or more map models include one or more directives for associating the one or more facts, the one or more fact-relationships, the one or more actions, the one or more skills, or the one or more skill-relationships with one or more nodes or one or more edges in the plurality of profile graphs.

In one or more of the various embodiments, in response to query information provided by one or more analysis applications, further actions may be performed, including: classifying a portion of the plurality of profile graphs based on the query information such that the portion corresponds to one or more nodes or one or more edges that match one or more expressions in the query information; providing the classified portion of the plurality of profile graphs to one or more of an analysis application or in a report for a user; or the like.

In one or more of the various embodiments, in response to providing new profile information, further actions may be performed including: classifying new profile information based on the unified schema; updating the portion of the plurality of profile graphs based on the new classified profile information; generating one or more new profile graphs based on the new profile information; or the like.

In one or more of the various embodiments, generating the plurality of profile graphs may include: associating each of the one or more facts with a node in the one or more profile graphs based on the one or more map models and the unified schema; associating each of the one or more fact-relationships with an edge in the one or more profile graphs based on the one or more map models and the unified schema such that each edge connects two or more fact nodes based on a relationship between the two or more facts; or the like.

In one or more of the various embodiments, generating the plurality of profile graphs may include: associating each of the one or more skills with a node in one or more profile graphs based on the one or more map models and the unified schema; associating each of the one or more actions with an edge in the one or more profile graphs based on the one or more map models and the unified schema such that the edge corresponds to one or more activities that resulted in a skill being associated with a subject.

In one or more of the various embodiments, generating the plurality of profile graphs may include: associating each of the one or more skills with a node in one or more profile graphs based on the one or more map models and the unified schema; associating each of the one or more skill-relationships with an edge in the one or more profile graphs based on the one or more map models and the unified schema such that the edge associates one or more other skills with a skill associated with a subject based on the subject's completion of an action.

In one or more of the various embodiments, generating the plurality of profile graphs, may include: determining one or more attributes associated with one or more external services based on the one or more map models; providing one or more values for the one or more attributes based on the one or more external services such that the one or more values are separate from the profile information; associating the one or more attribute values with one or more of a node or an edge in the plurality of profile graphs based on the one or more map models; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, predictive learner platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, predictive learner platform server computer 116, or other computers.

Client computers 102-105 may further be configured to include a client application that enables an end-user to log into an end-user account that may be managed by another computer, such as ingestion platform server computer 116, profile correlation server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by predictive learner platform server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, predictive learner platform server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of predictive learner platform server computer 116 are described in more detail below in conjunction with FIG. 3. Although FIG. 1 illustrates predictive learner platform server computer 116 as a single computer, the innovations or embodiments are not so limited. For example, one or more functions of predictive learner platform server computer 116 may be distributed across one or more distinct network computers. Moreover, in one or more embodiments, predictive learner platform server computer 116 may be implemented using a plurality of network computers. Further, in one or more of the various embodiments, predictive learner platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
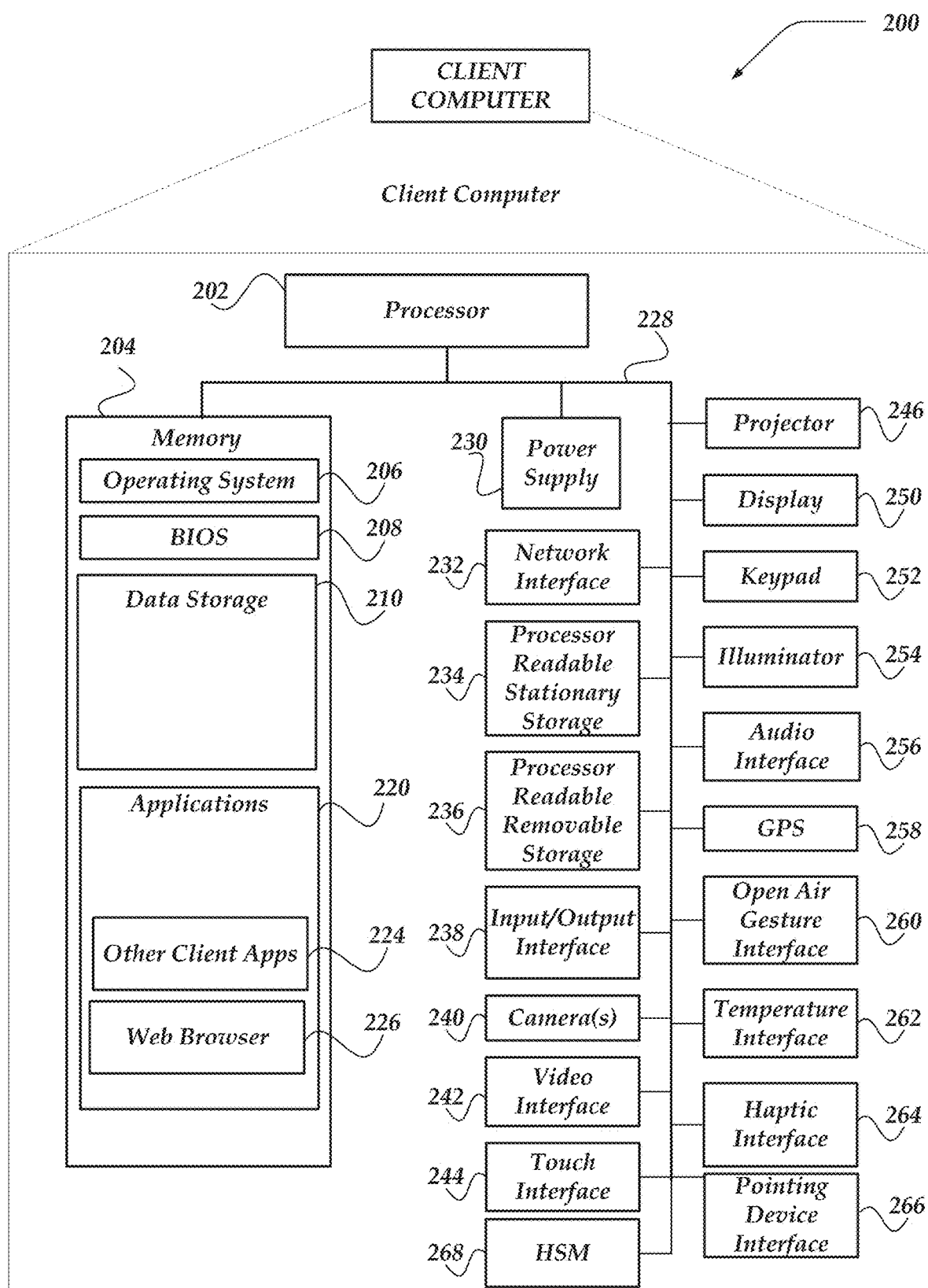
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
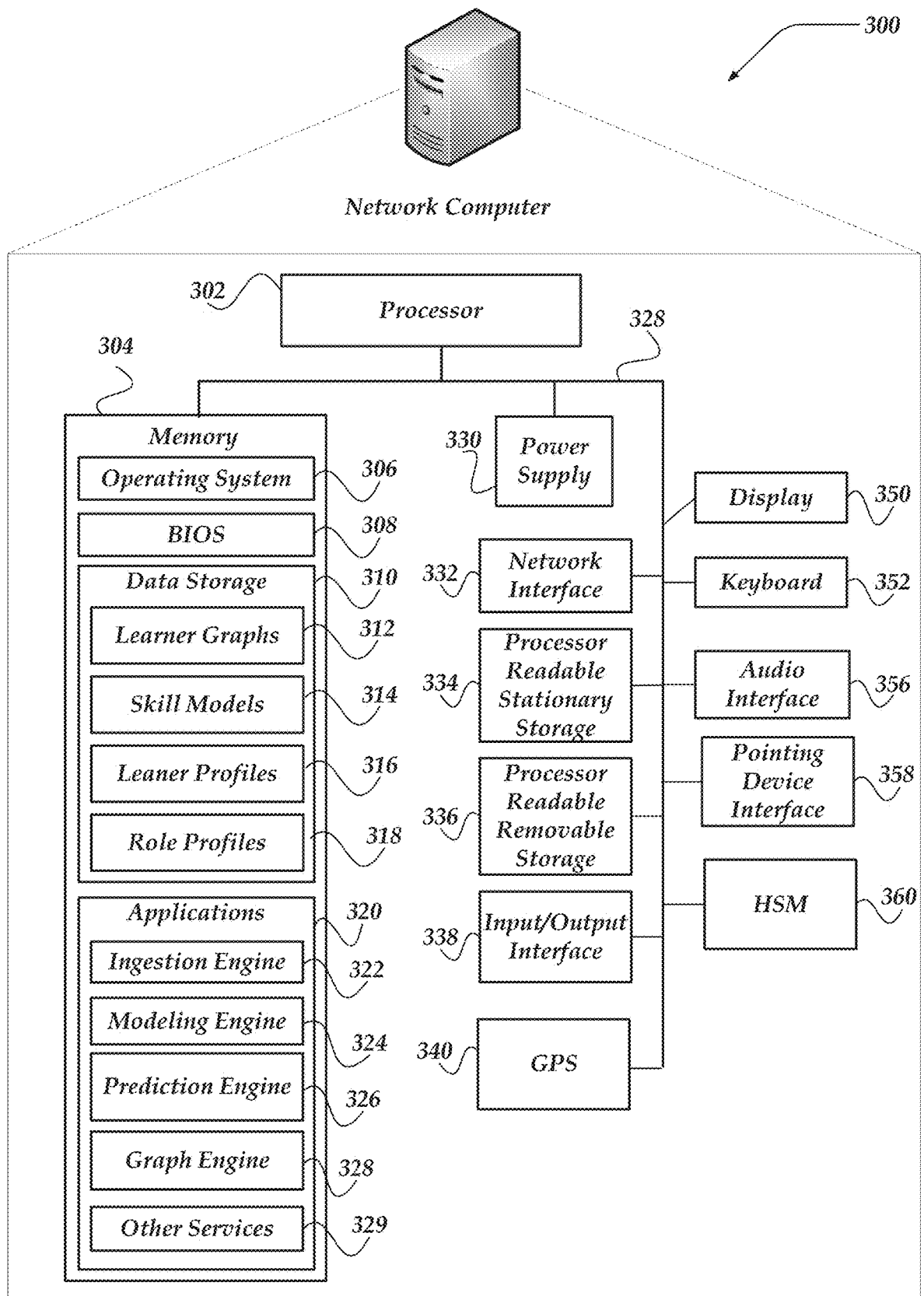
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a predictive learner platform server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, ingestion engine 322, modeling engine 324, prediction engine 326, graph engine 328, other services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, learner graphs 312, skill models 314, student profiles 316, role profiles 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, modeling engine 324, prediction engine 326, graph engine 328, other services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, ingestion engine 322, modeling engine 324, prediction engine 326, graph engine 328, other services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to ingestion engine 322, modeling engine 324, prediction engine 326, graph engine 328, other services 329, or the like, may be provisioned and de-commissioned automatically.

Also, in one or more of the various embodiments, ingestion engine 322, modeling engine 324, prediction engine 326, graph engine 328, other services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
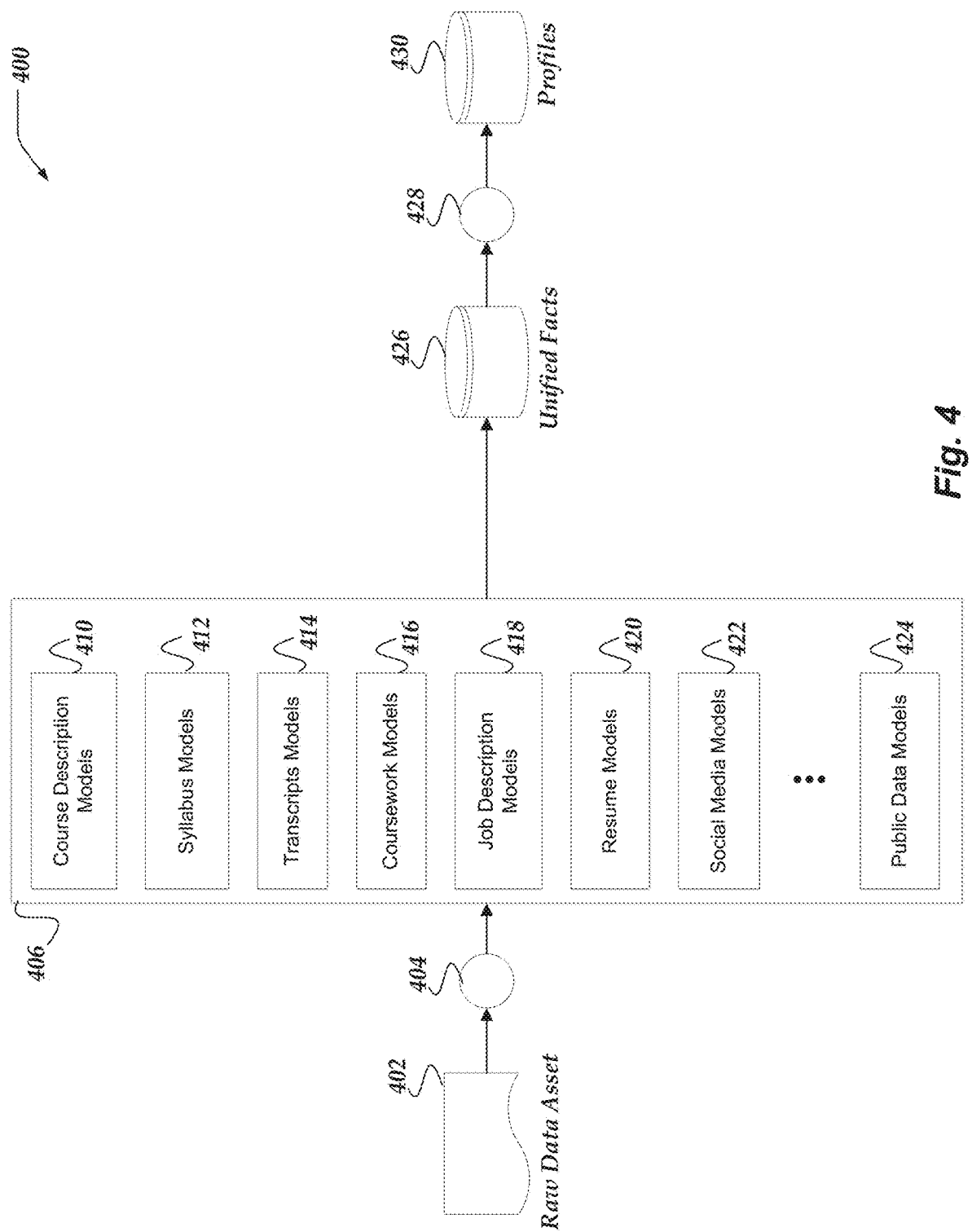
FIG. 4 illustrates a logical schematic of a system for a predictive learner platform for unified graph representation of skills and acumen in accordance with one or more of the various embodiments.

FIG. 4 illustrates a logical schematic of system 400 for a predictive learner platform for unified graph representation of skills and acumen in accordance with one or more of the various embodiments. In some embodiments, system 400 may be arranged to receive a raw data asset, such as, raw data asset 402. In some embodiments, raw data asset 402 may be categorized or otherwise pre-processed via one or more components, represented by component 404. For example, in some embodiments, component 404 may be a categorization engine, or the like.

In one or more of the various embodiments, raw data asset 402 may be provided to a translation engine, such as, translation engine 406. Accordingly, in one or more of the various embodiments, translation engine 406 may be arranged to employ one or more translation models that may be arranged to match some or all of information included in raw data asset 402 to one or more unified facts.

In one or more of the various embodiments, processes performed by components 404 may include categorizing raw data asset 402 and then based on the result of the categorization, one or more translation models arranged for interpreting the category of data that has been associated with raw data asset 402.

In one or more of the various embodiments, translation models may be arranged to process data assets associated with one or more categories that may represent a specific topics or information classes. In this example, raw data asset 402 may be associated with students, schools, employers, or the like. Thus, in this example, translation models may be targeted to different types of raw data assets. Accordingly, in one or more of the various embodiments, translation models may include course description models 410, syllabus models 412, student transcript models 414, coursework models 416, job description models 418, resume models 420, social media models 422, public data models 424, or the like.

Accordingly, in one or more of the various embodiments, translation engine 406 may execute one or more translation operations based on heuristics, machine learning classifiers, machine learning models, rules, instructions, or the like, defined or referenced by the one or more translation models. In some embodiments, translation operations may include identifying information included in the raw data that can be matched to a unified schema to provide unified facts.

In one or more of the various embodiments, unified facts generated by the translation engine may be stored in a unified fact data store, such as, data store 426.

In one or more of the various embodiments, the unified facts may be employed to generate various profiles, such as, student profiles, employer profiles, school profiles, or the like, that may be used for providing reports (interactive or otherwise) to users of a data ingestion system.

In one or more of the various embodiments, profiles may be comprised of one or more unified facts that may include one or more subject facts or one or more non-subject facts. In some embodiments, a profile engine may be arranged to employ profile models to determine the contents of a profile. In some embodiments, profiles may be arranged to encapsulate the rules, heuristics, machine-learning classifiers, or the like, that may be employed to generate profiles based on one or more unified facts.

Figure 5:
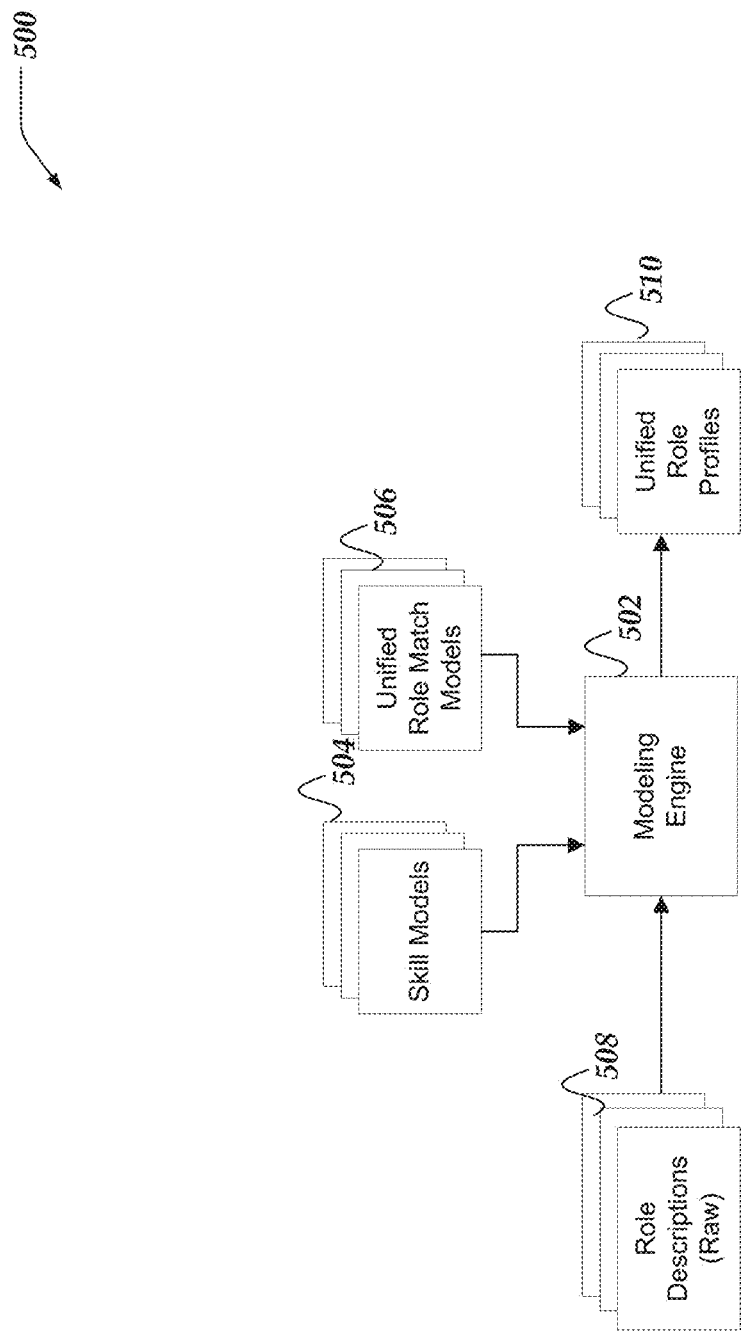
FIG. 5 illustrates a logical representation of a system for unified graph representation of skills and acumen in accordance with one or more of the various embodiments.

FIG. 5 illustrates a logical representation of system 500 for unified graph representation of skills and acumen in accordance with one or more of the various embodiments. In one or more of the various embodiments, system 500 may be a portion of a predictive learner platform directed to generating role profiles from raw role descriptions. Accordingly, in some embodiments, system 500 may be arranged to employ various components, including, modeling engine 502, skill models 504, role match models 506, role descriptions 508, or the like, to provide one or more unified role profiles.

In one or more of the various embodiments, role descriptions 508 may be natural language text information associated with job descriptions, career roles, career paths, or the like. In some embodiments, role descriptions may be taken directly from publicly or privately listed job offerings, or the like. In some embodiments, public role descriptions may be collected from various sources. For example, in some embodiments, predictive learner platforms may be arranged to integrate with various services the provide publicly available job descriptions, or the like, such as, job advertisement systems, corporation websites, career service centers, employment security departments, or the like. In some embodiments, predictive learner platforms may be integrated with private sources of job offerings, such as, internal job boards of corporations.

In one or more of the various embodiments, skill models 504 may be arranged to extract or identify skill information that may be included in role descriptions 508. In one or more of the various embodiments, one or more text processing models may be employed to determine one or more skills that may be included in the role description text.

In one or more of the various embodiments, skill models may be arranged to determine one or more skill topics in the role description text and map those skill topics to unified skills. Accordingly, in some embodiments, skill models may be arranged to recognize that two or more different skill topic words that may be used in role descriptions may have the same semantic meaning. For example, for some embodiments, a skill model may be arranged to map skill words, such as, 'programmer,' 'hacker,' or 'developer' to a unified skill of 'software developer,' or the like.

In one or more of the various embodiments, skills identified from role descriptions may be included in one or more feature vectors. In some embodiments, feature vectors associated with skills may be referred to as skill vectors. In some embodiments, different skill vectors may be focused on different type of skills, such as, hard skills or soft skills. Accordingly, in some embodiments, each role description may be associated with one or more skill vectors or one or more feature vectors.

In one or more of the various embodiments, role descriptions may include role titles (e.g., job titles). However, in some embodiments, various enterprises, corporations, or otherwise, often use different job titles for the same or similar roles. Accordingly, in some embodiments, role match models 506 may include one or more hybrid NLP models that may matched titles included with role descriptions to a unified collection of role profiles or unified role titles. In some embodiments, role match models may employ NLP models to identify key title words that may be used to match with unified role titles.

In one or more of the various embodiments, skill vectors from individual role descriptions that are mapped to the same unified role title may be aggregated into a skill vectors that may be associated with unified role profiles. Accordingly, in one or more of the various embodiments, unified role profiles that include one or more feature vectors or skill vectors based on a corpus of role descriptions that have been mapped the same unified role title.

Also, in some embodiments, one or more role match models may consider skill vectors determined from role descriptions to validate or influence which unified role title they may be mapped to. Accordingly, in some embodiments, if skill vectors derived from the text of a role description significantly deviate from the aggregate skill vectors associated with the unified role profile it may be mapped to based on its role description title, the mapping based on the role description title may be overridden. In some embodiments, if there may be a mismatch between a role description title and the skills derived from the role description body, the skill vectors may be considered to identify one or more other unified role title that may be better matches for the role descriptions. In some embodiments, if the similarities of the skill vectors associated with role descriptions having mismatched titles exceed a threshold value, modeling engines may be arranged to override the role title match and match role descriptions to unified role profiles based on the skill vectors or other feature vectors.

In one or more of the various embodiments, one or more mismatched role descriptions may be flagged or tagged for later review. Likewise, in some embodiments, modeling engines may be arranged to identify or quarantine mismatched role descriptions to enable administrators or other users to make final determination of which unified role profile a mismatch role description should be associated with.

Figure 6:
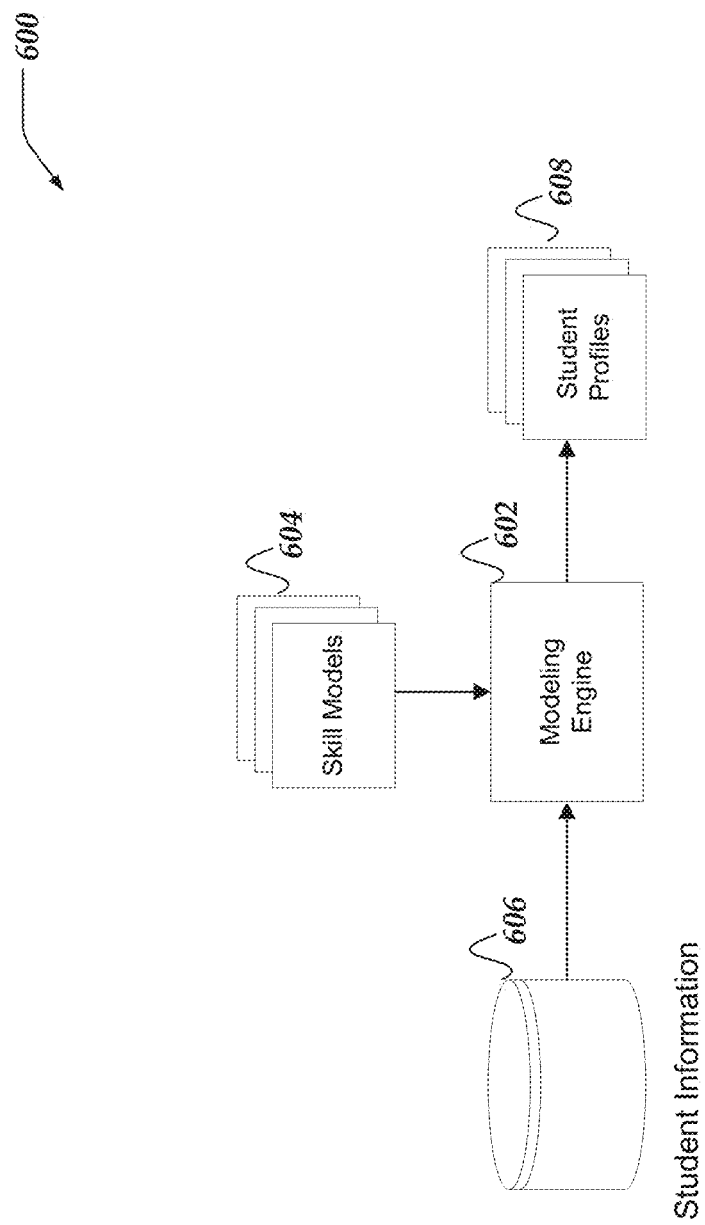
FIG. 6 illustrates a logical representation of a system for unified graph representation of skills and acumen in accordance with one or more of the various embodiments.

FIG. 6 illustrates a logical representation of system 600 for unified graph representation of skills and acumen in accordance with one or more of the various embodiments.

In one or more of the various embodiments, system 600 may be arranged to include modeling engine 602, skill models 604, or the like. In one or more of the various embodiments, skill models 604 may be arranged to produce feature vectors or skill vectors from text information included in student information 606. Accordingly, modeling engines may be arranged to generate student profiles, such as, student profiles 608, that may include features or skills from alumni information. In some embodiments, students may be considered persons that may be employing a predictive learner platform to evaluate various opportunities or explore pathways that may position them for one or more opportunities. Accordingly, in some embodiments, for brevity and clarity the term students should be considered to include, active students of colleges or universities, former students, employees, prospective employees, persons seeking new opportunities, person planning for the future or other preparing for future opportunities, or the like.

Accordingly, in some embodiments, student information 606 may be considered to the information for a single person. In one or more of the various embodiments, student information may include academic history, employment history, volunteer history, financial history, geographic information/travel history, or the like.

Accordingly, modeling engine 602 may be arranged to employ skill models 604 to generate student profiles. In some embodiments, student profiles may be different the alumni profiles because they are associated with a "live" user of the predictive learner platform rather than being provided in bulk from historical sources. Accordingly, in some embodiments, in addition to feature vectors or skill vectors, student profiles may be arranged to include information that may be relevant to their interactions with predictive learner platforms, such as, login credentials, current contact information, sponsoring organizations (if any), telemetry information associated with a person interaction with one or more predictive learner platform features, feedback information, or the like.

In one or more of the various embodiments, modeling engines may be arranged to employ skill models to extract skill for skill vectors from various types or sources of student information, including, transcripts, course descriptions, course syllabuses, self-reported information, employment history, or the like. In some embodiments, one or more skills or features may be determined from public sources, such as, social media, press releases, new reports, or the like.

Figure 7:
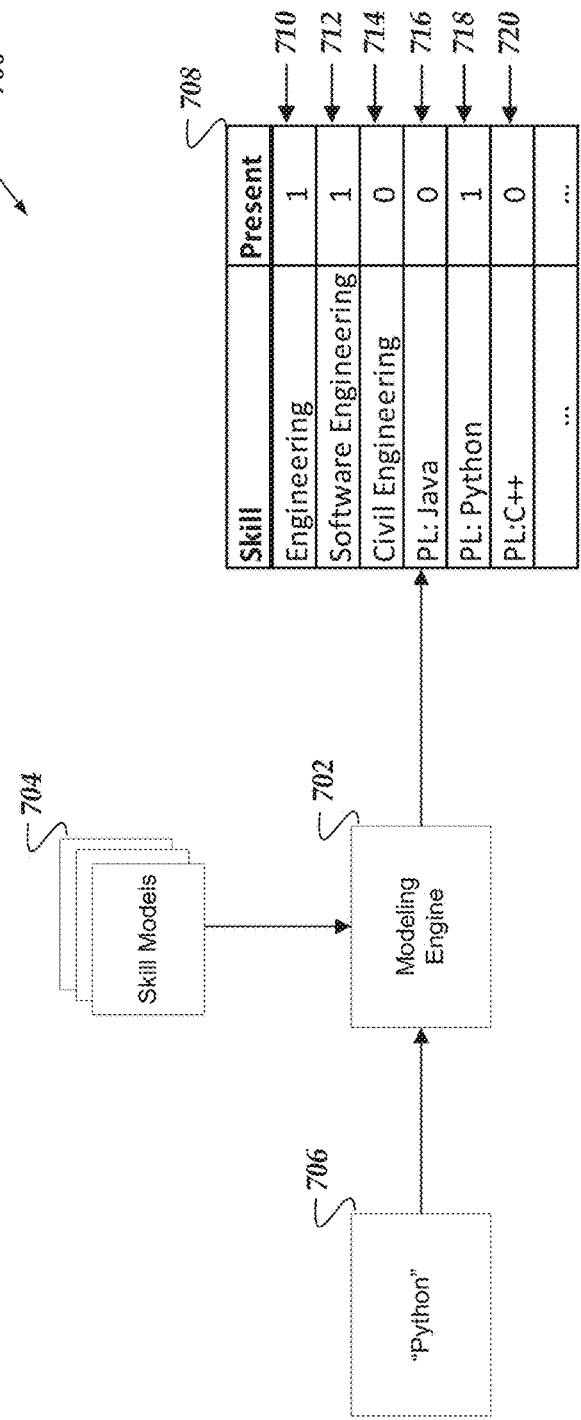
FIG. 7 illustrates a logical representation of a system for predictive learner scores in accordance with one or more of the various embodiments.

FIG. 7 illustrates a logical representation of system 700 for predictive learner scores in accordance with one or more of the various embodiments. In one or more of the various embodiments, modeling engines, such as modeling engine 702 may be arranged to map topic words discovered from student information, alumni information, or role descriptions, to skills included in various skill vectors. In one or more of the various embodiments, modeling engines may be arranged to map one skill topic to more than one skill elements in skill vectors or more than one feature elements in feature vectors.

In one or more of the various embodiments, one or more skills in the same skill vector may overlap. In some embodiments, one or more skills may have hierarchical relationship with one or more other skills. In some embodiments, one or more skills may be broader in scope or more general than other skills. In some embodiments, one or more broader skills may be matched by related specific skills.

In this example, modeling engine 702 may be arranged to employ skill models 704 to map skill topic 706 to skill vector 708. In this example, the value of skill topic 706 is "python," representing a skill of programming with the python programming language. For example, in one or more of the various embodiments, modeling engines may have determined that a student know python based on parsing the course descriptions college courses completed by the student.

Accordingly, in some embodiments, modeling engine 702 may be arranged to add skills to skill vector 708 that may be associated with having a skill of python programming. In this example, modeling engine 702 may employ skill models 704 to add three skills to skill vector 708 for the student. Namely, in this example, engineering skill 710, software engineering skill 712, and programming language: python skill 718.

Thus, in this example, a student that has a skill in python programming will also be assigned a skill of engineering skill 710 (the broadest), software engineering skill 712, and programming language:python skill 718. In contrast, in some embodiments, skill in the python programming would not assign a student civil engineering skill 714. Note, in some embodiments, other skill topics for the student, such as, surveying, structural engineering, soil engineering, or the like, may be discovered independently of the python skill, causing a modeling engine to assign a civil engineering skill to the student corresponding to skill vector 708.

Likewise, in this example, while a skill of python indicates that a student has software engineering skill 712, it does not indicate that the student has programming language:Java skill 716 or programming language:C++, though other skill topics included in the relevant student information may do so.

Note, one of ordinary skill in the art will appreciate that skill vectors may include more or different skill elements than shown here. In some embodiments, the skill elements included in skill vectors may evolve as new skill models, or the like, may be developed. Likewise, one or more skill elements that were favored previously may be determined to be less valuable later for providing useful guidance, predictions, or comparisons. In some embodiments, ongoing machine-learning training of models as well as user feedback may influence the identification of skill topics or if they may be added to skill vectors. Similarly, feature vectors or feature elements may evolve for various reasons, such as, additional information may be processed, machine-learning model training, user feedback, or the like.

Figure 8:
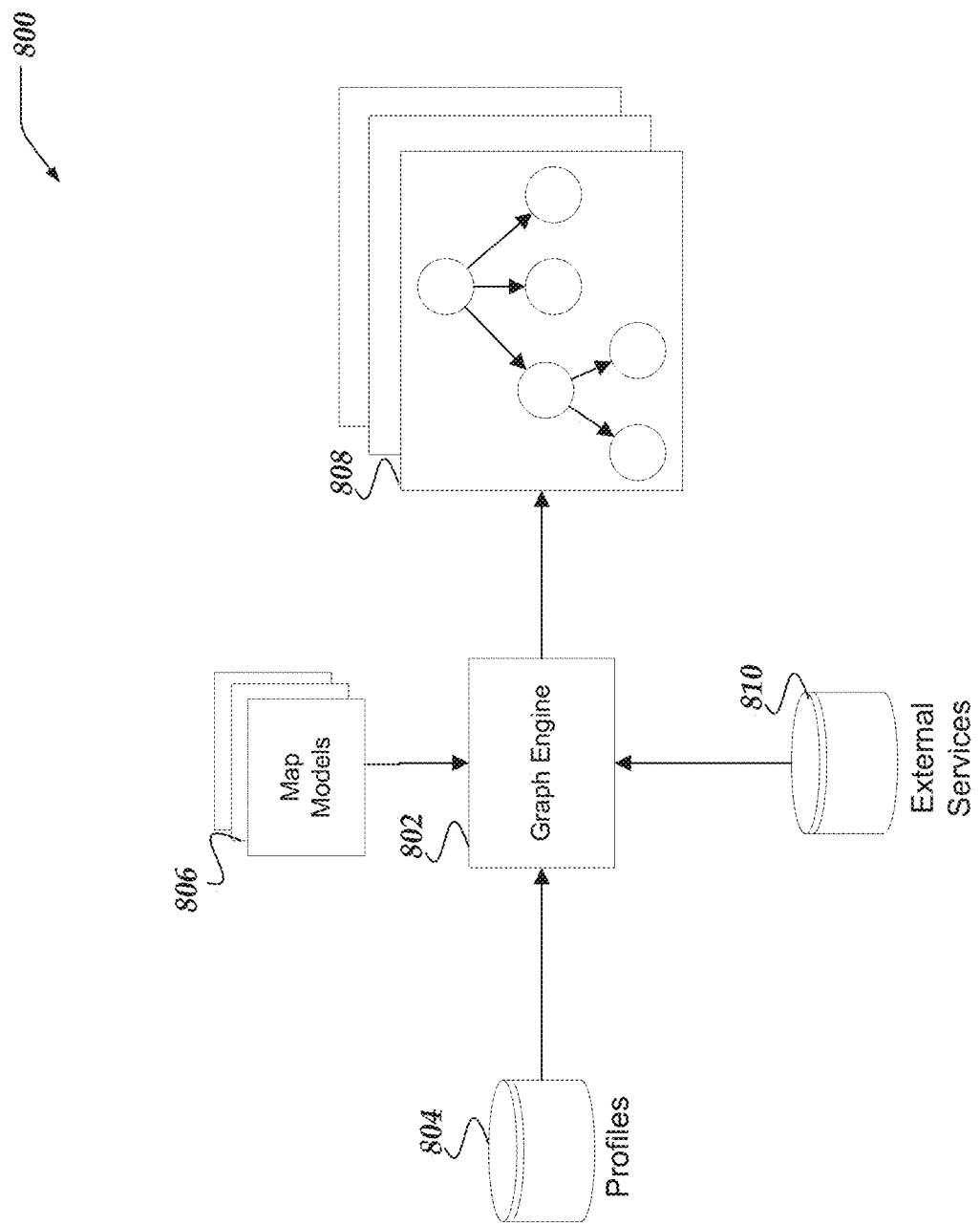
FIG. 8 illustrates a logical schematic of a system for unified graph representation of skills and acumen in accordance with one or more of the various embodiments.

FIG. 8 illustrates a logical schematic of system 800 for unified graph representation of skills and acumen in accordance with one or more of the various embodiments. In some embodiments, systems such as system 800 may comprises one or more of graph engine 802, profile data store 804, map models 806, learner graphs 808, or the like.

In one or more of the various embodiments, graph engines, such as, graph engine 802 may be provided one or more profiles, such as, learner profiles, role profiles, or the like. In some embodiments, these profiles may be provided from a conventional data store represented here by profiles data store 804. Accordingly, in some embodiments, graph engines may be arranged to generate graph representations of the entities corresponding to the profiles based on one or more mapping models (mapping models 806).

In one or more of the various embodiments, graph engines may be arranged to translate information associated with profiles into graphs such that unified facts, hard skills, soft skills, or the like, may be mapped to vertices/nodes. Similarly, in some embodiments, actions such as coursework, training, employment events/outcomes, or the like) may be mapped to edges. For example, if a learner successfully completes a college course that grants them one or more skills, the completing college course may be included in the learner's graph as an edge while the resultant skills may be represent as nodes in the learner graph.

In one or more of the various embodiments, graph engines may be arranged to be provided profiles that have skills or actions defined based on a unified schema. Accordingly, in some embodiments, graph engines may be insulated from data inconsistencies, naming mismatches, other extract, transform, load (ETL) issues, or the like. For brevity and clarity, one or more mechanisms for generating profiles are described herein. See, FIGS. 4-7. However, one of ordinary skill in the art will appreciate that profiles may be provided from other sources or otherwise based on other mechanisms.

In one or more of the various embodiments, map models may comprise data structures that represent one or more of heuristics, machine-learning models, rules, or the like, that may graph engines may employ to interpret profiles to determine the structure of corresponding graphs. Accordingly, in some embodiments, one or more map models may be provided to support different types of data stores, formats, access methods, or the like, that may be associated with access or interpreting profiles. For example, in some embodiments, profiles may be at least partially based on conventional relational data design or storage, such that entities or relationships may be determined by conventionally interrogating the RDBMS that may be storing the profiles. Further, in some embodiments, graph engines may employ map models to adapt to different unified schemas or modified unified schemas.

Further, in some embodiments, graph engines may be arranged to employ map models to assign attributes to nodes or edges that may not be represented in profiles. In one or more of the various embodiments, graph engines may be arranged to assign weight values or distance values to edges based on the features of the corresponding action. For example, in some embodiments, attributes that may be associated with the time, effort, or cost of actions may be associated with their corresponding edges.

In one or more of the various embodiments, map models may declare one or more references to external services such as external service 810. In some embodiments, external services may be considered services that may provide information separate from the information included the profiles. Accordingly, in some embodiments, graph engines may be arranged to incorporate information obtained from external services into profile graphs as per one or more map models. For example, in some embodiments, external services may be employed to provide supplemental information, such as, geographic distances, weather information, tuition/cost information, course (action) availability, or the like. In some embodiments, supplement services may provide information that may be separate from information provided by an ingestion engine. Accordingly, in some embodiments, map models may be customized for to support local requirements or local circumstances separate from the ingestion pipeline that provides the profile information. In some embodiments, graph engines may be arranged to support a plugin/modular architecture that enable graph engines to communicate with external services.

Figure 9:
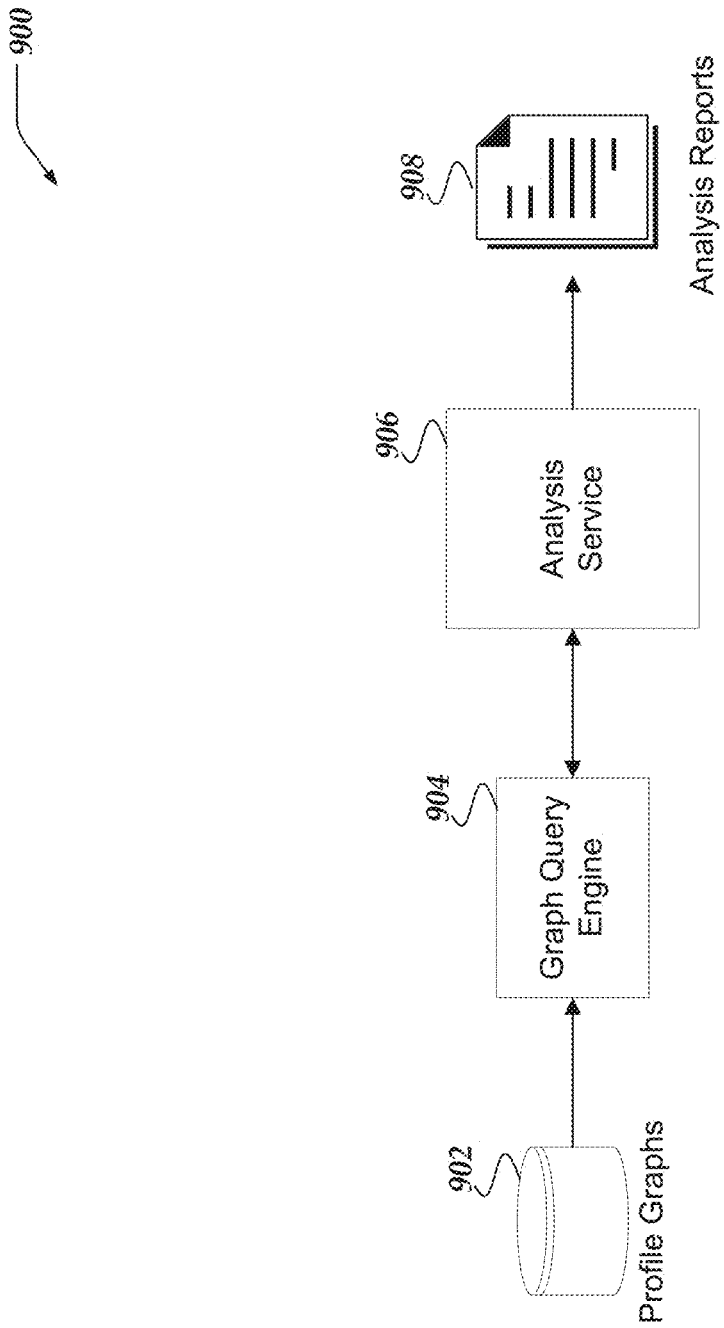
FIG. 9 illustrates a logical schematic of a system for unified graph representation of skills and acumen in accordance with one or more of the various embodiments.

FIG. 9 illustrates a logical schematic of system 900 for unified graph representation of skills and acumen in accordance with one or more of the various embodiments. In some embodiments, systems such as system 900 may comprise one or more of: profile graphs 902; graph query engine 904; one or more analysis services, such as, analysis service 906; one or more analysis reports, such as, analysis report 908.

As described above, in some embodiments, graph query engines may be arranged to generate one or more profile graphs from profiles, one or more map models, or the like. In some embodiments, data store 902 may be a graph-based data store that may provide built-in/native support of graph representation, graph queries, or the like. Also, in some embodiments, data store 902 may be a conventional database with a schema designed to support graph representations of profile graphs.

In one or more of the various embodiments, graph query engines may be arranged to generate one or more query results based on one or more queries directed to stored profile graphs. In some embodiments, graph query engine 904 may be considered a built-in feature of data store 902. Also, in some embodiments, graph query engine 904 may be separate engine that may be arranged to reformulate graph queries into queries that may conform to data store 902. Likewise, in some embodiments, if data store 902 may not provide direct support for graph-based results, graph engines may be arranged to translate conventional query result sets in graph data structures.

In one or more of the various embodiments, analysis services such as analysis service 906 may represent one or more services that enable users to analyze profile graphs to discover various insights about the populations represented by the profile graphs. In some embodiments, analysis services may provide various user interfaces, including, command-line interfaces, graphical user-interfaces, visual programming (no-code) user interfaces, or the like, that may be directed to one or more particular use-cases. For example, a minimal analysis service may be a command-line interface that may enable users to directly provide graphQL (or the like) queries directly to graph query engine 904. Also, for example, another analysis service may provide a rich graphical user interface that may enable users to provide information/actions that may be translated in the queries that may be processed by graph query engine 904. One of ordinary skill in the art will appreciate that there may been an arbitrary number of different analysis services each directed to one or more different requirements or circumstances without departing from the scope of the innovations disclosed herein.

Further, in some embodiments, analysis reports, such as, analysis report 908 may be considered to represent one or more views of the information, insights, or the like, users may obtain via analysis service 906. One of ordinary skill in the art will appreciate that analysis report 908 may include interactive reports, such as, dashboards, charts, tables, or the like, that may be displayed in a graphical display associated with analysis service. Likewise, in some embodiments, analysis report 908 may include conventional hard-copy report/documents, log files, records stored in databases, XML files, or the like.

Figure 10:
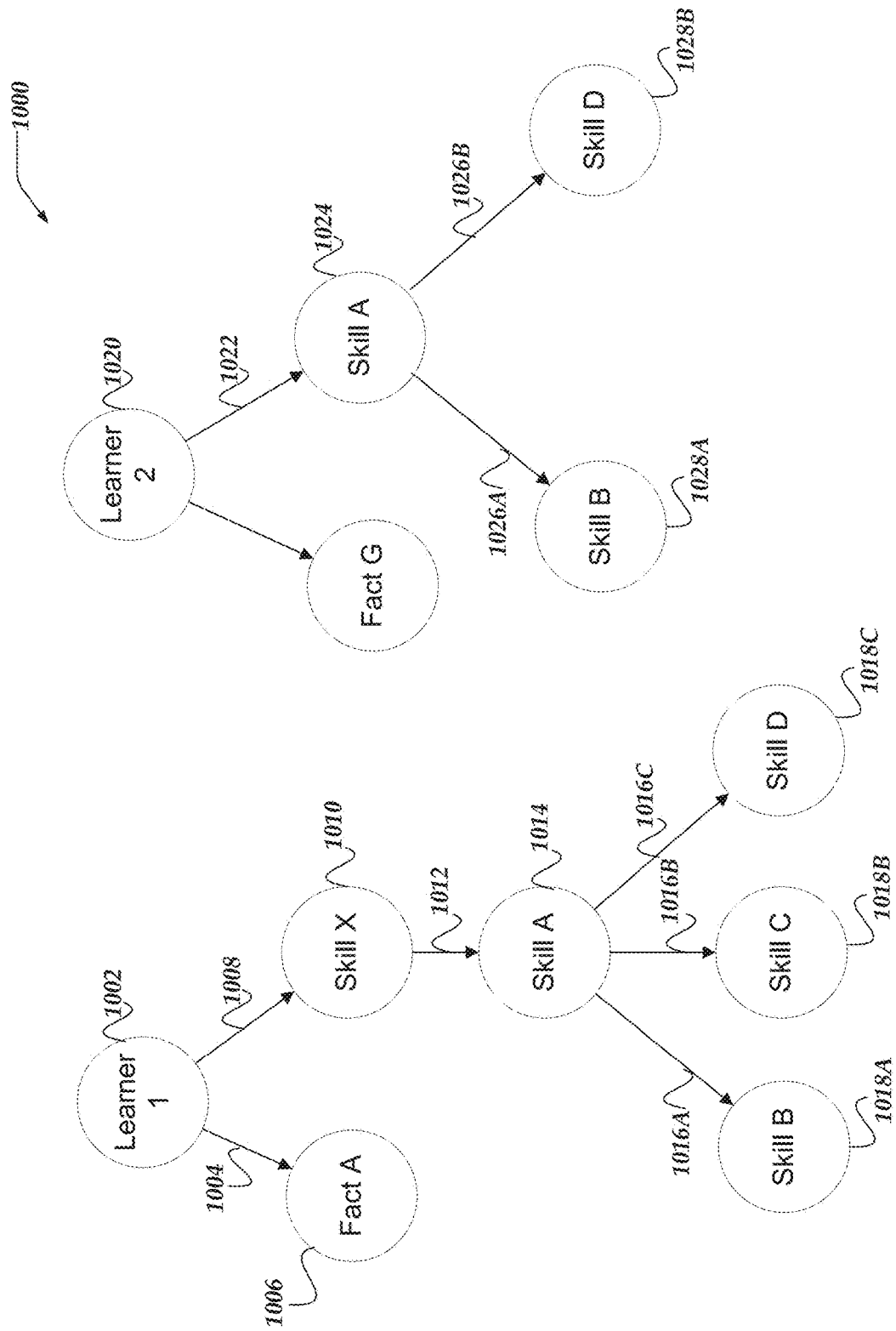
FIG. 10 illustrates a logical schematic for a system for unified graph representation of skills and acumen in accordance with one or more of the various embodiments.

FIG. 10 illustrates a logical schematic for system 1000 for unified graph representation of skills and acumen in accordance with one or more of the various embodiments.

In one or more of the various embodiments, profile graphs may comprise edges and nodes. In some embodiments, edges may represent relationships information regarding how connected nodes are related to each other or the profile as a whole. In some embodiments, edges may include or represent information associated with one or more actions that resulted in the relationship between two or more nodes. For example, an edge such as edge 1004 may correspond to a student being accepted at an education organization and node 1006 may represent the mailing address or other vital statistics associated with the student. In some embodiments, edges may simply represent an association between two or more nodes without reference to a specific action.

In this example, for some embodiments, Learner 1 has performed an action represented by edge 1008 that resulted in Learner 1 being granted or assigned Skill X (node 1010). Further, in this example, Learner 1 may be considered to have taken a subsequent action, represent by edge 1012 that resulted in granting Learner 1 Skill A (node 1014).

Also, in some embodiments, some edges may represent the relationship between skill topics and skill elements. See, FIG. 7. Accordingly, in this example, edge 1016A, edge 1016B, edge 1016C represent the relationship between skill topic Skill A (node 1014) and skill elements Skill B (node 1018A), Skill C (node 1018B), and Skill D (node 1018C).

Similarly, in this example, for some embodiments node 1020 represent root node of a profile graph for Learner 2. Also, similarly, edge 1022 represents one or more actions that result in Learner 2 being granted or assigned Skill A (node 1024) which in turns provides relationships (edge 1026A and edge 1026B) to Skill B (node 1028A), and Skill B (node 1028B).

Accordingly, in some embodiments, profile graphs may enable insights regarding the skills and acumen of the underlying profiles. For example, while both Learner 1 and Learner 2 have Skill D (node 1018C and node 1028c), the two learner took different educational pathways to obtain the some of the same skills. Accordingly, in this example, a user may employ the profile graphs to identify differences in how a learner obtained various skills. For example, Learner 1 may have performed an action that granted them Skill X which then qualified them to perform other actions that granted them Skill A. In contrast, in this example, Learner 2 performed a different action (edge 1022) which immediately granted them Skill A. In this example, the action corresponding to edge 1008 may have been an introductory course that granted Skill X which may be a pre-requisite for taking a course to learn Skill A. Whereas, in this example, Leaner 2 may have taken a different course (from the same or different organization) that enabled them to be granted Skill A without explicitly/separately taking a course for Skill X.

In some embodiments, attributes associated with edges may reflect features that distinguish one or more similar actions from another. For example, edge 1008 and edge 1010 may both represent 'taking a course' but edge 1008 may represent taking-a-course action that may have different features than the taking-a-course action represented by edge 1022. For example, in some embodiments, edge 1008 may represent three week review seminar while edge 1022 may represent a fourteen week semester course.

Similarly, in some embodiments, topic skills granted via different actions may result in different related skills. For example, in some embodiments, Learner 1 took actions (edge 1012) to learn Skill A (node 1014) that also provided skill elements Skill B (node 1018A), Skill C (node 1018B), and Skill D (node 1018C). While, in contrast, the actions (edge 1022) taken by Leaner 2 to obtain topic Skill A (node 1024) resulted in two skills rather than three skills.

In one or more of the various embodiments, data structures employed for representing edges may include one or more fields or references to fields (pointers) that may store various values associated with one or more features of a given action. In one or more of the various embodiments, edges may be associated with a cost function based on the various feature values. Accordingly, in some embodiments, cost functions may be employed as part of comparing the cost of different paths through profile graphs. Accordingly, in some embodiments, analysis applications may be configured to determine one or more insights based on comparing the costs associated with different paths that may or may not lead to some of the same skills. For example, in some embodiments, features such as price, tuition, duration, time-cost, geographic distances, or the like. Also, in some embodiments, features may include discrete values. For example, in some embodiments, features associated with scheduling availability, such as, once-a-week, five-days-a-week, full-time, part-time, day courses, night courses, or the like, may be associated with actions and therefor edges in a profile graph.

Figure 11:
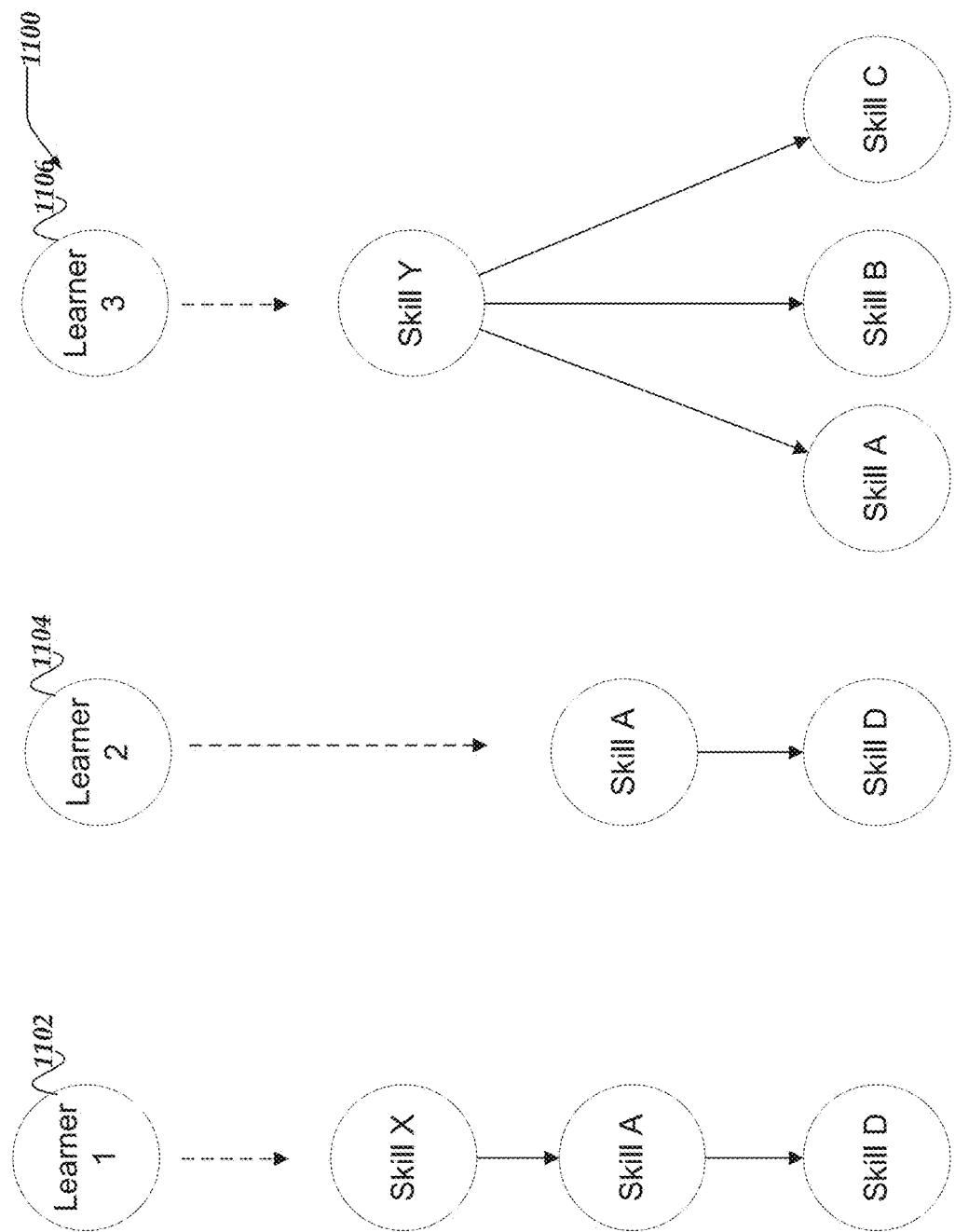
FIG. 11 illustrates a logical schematic for a system for unified graph representation of skills and acumen in accordance with one or more of the various embodiments.

FIG. 11 illustrates a logical schematic for system 1100 for unified graph representation of skills and acumen in accordance with one or more of the various embodiments.

In one or more of the various embodiments, system 1100 represents portions of three profile graphs that may be generated by a graph engine. In this example, profile graph 1102, profile graph 1104, and profile graph 1106 may be considered to represent portions of profile graphs for different learners. Note, in this example, for brevity and clarity reference numbers for each node and edge of the profile graphs are omitted. In this example, the dashed arrow between the learner nodes and profile graph portions represent that there may be an arbitrary number of intervening nodes or edges that are not shown.

In some embodiments, profile graphs may enable analysis applications to compare how different learner may have obtain the same skill. In this example, Skill A is illustrated as being common across the three profile graphs. However, in this example, for some embodiments the different learners have went through different actions to obtain the same skill. In this example, Learner 1 performed an action after obtaining Skill X which granted them Skill A. Learner 2 performed actions that resulted in obtaining Skill A while not obtaining Skill X. And, finally, in this example, Learner 3 obtained Skill Y which resulted granting three sub-skill, including Skill A.

In one or more of the various embodiments, users may be enabled to discover insights about the learners, actions, and skills by comparing how different learners obtain the same skill. As described above, graph engine may be arranged to associate one or more values that represent one or more features of the actions that correspond edges in profile graphs. Accordingly, in some embodiments, paths to obtain skills may be compared and contrasted using one or more dimensions of cost. For example, different actions that may result in a learner learning the same skill may be compared or discovered. Accordingly, insights associated with how a learner obtains skills may be determined. For example, a review of profile graph 1106 may determine that Learner 3 performed some actions to learn Skill Y which also resulted in them learning Skill A plus Skill B and Skill C. In contrast, a review of profile graph 1102 may determine that Learner 1 performed some actions to learn Skill X and them more actions to learn Skill A.

Generalized Operations

FIGS. 12-15 represent generalized operations for unified graph representation of skills and acumen in accordance with one or more of the various embodiments. In one or more of the various embodiments, processes 1200, 1300, 1400, and 1500 described in conjunction with FIGS. 1-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 12-15 may perform actions for unified graph representation of skills and acumen in accordance with at least one of the various embodiments or architectures such as those described in conjunction with FIGS. 1-11. Further, in one or more of the various embodiments, some or all of the actions performed by processes 1200, 1300, 1400, and 1500 may be executed in part by ingestion engine 322, modeling engine 324, prediction engine 326, graph engine 328, or the like.

Figure 12:
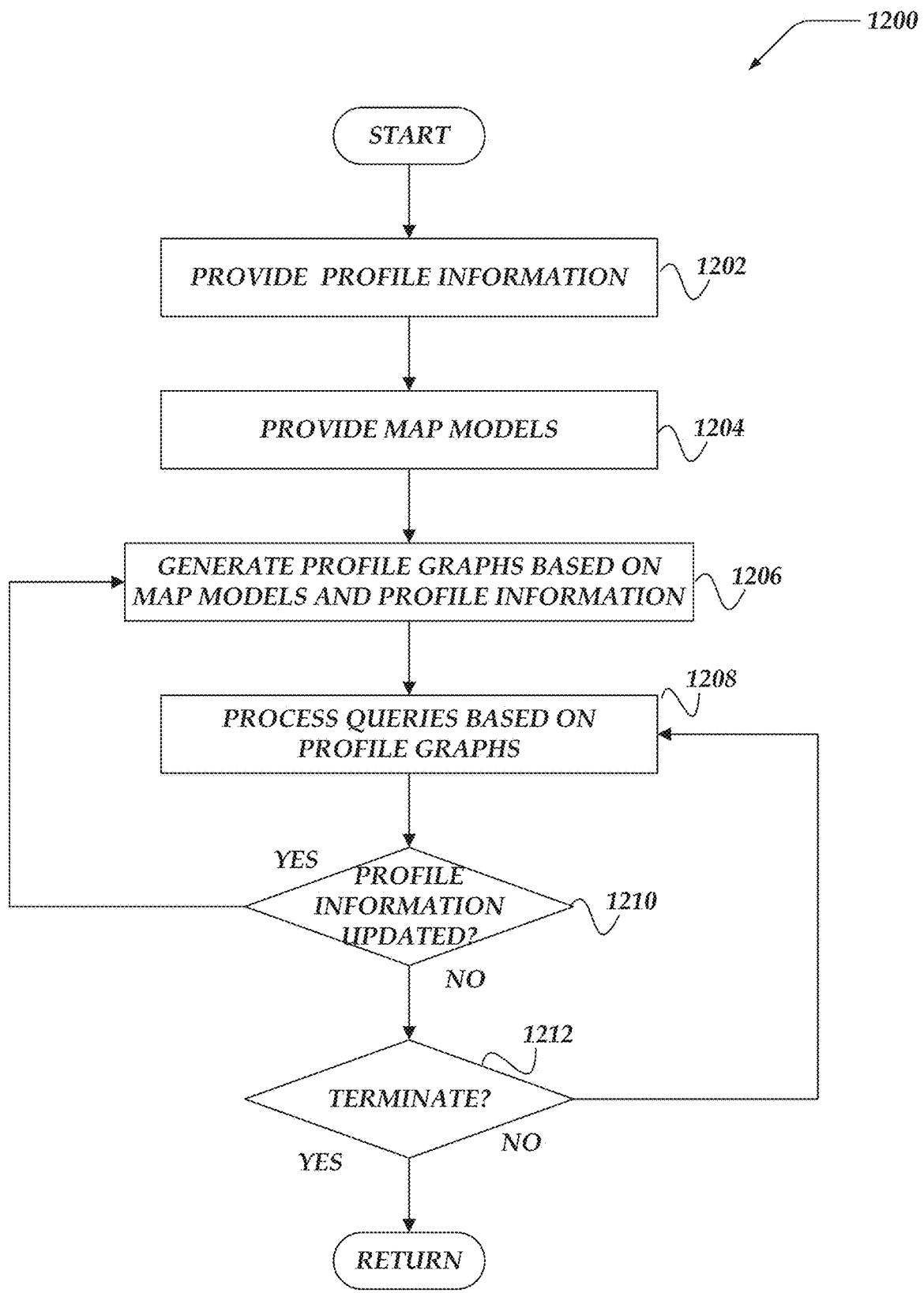
FIG. 12 illustrates an overview flowchart of a process for unified graph representation of skills and acumen in accordance with one or more of the various embodiments.

FIG. 12 illustrates an overview flowchart of process 1200 for unified graph representation of skills and acumen in accordance with one or more of the various embodiments. After a start block, at block 1202, in one or more of the various embodiments, profile information may be provided to a graph engine. At block 1204, in one or more of the various embodiments, one or more map models may be provided to the graph engine. At block 1206, in one or more of the various embodiments, graph engines may be arranged to generate one or more profile graphs based on the one or more map models and the profile information. At block 1208, in one or more of the various embodiments, graph engines may be arranged to process one or more queries based on the one or more profile graphs. At decision block 1210, in one or more of the various embodiments, if the profile information may be updated, control may loop back to block 1206; otherwise, control may flow to decision block 1212. At decision block 1212, in one or more of the various embodiments, if the process may be terminated, control may be returned to a calling process; otherwise, control may loop back to block 1208. Next, in one or more of the various embodiments, control may be returned to a calling process.

Figure 13:
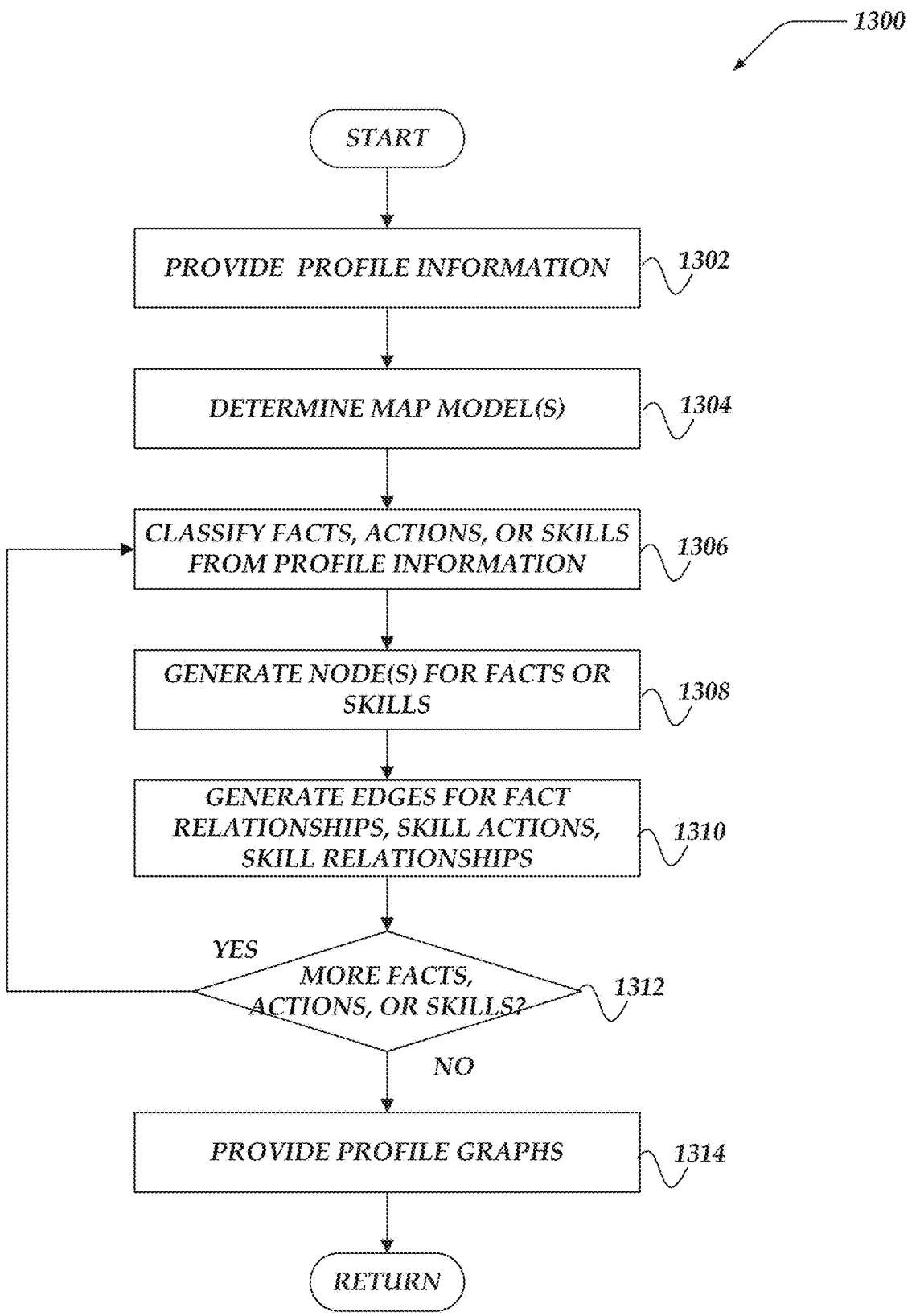
FIG. 13 illustrates a flowchart of a process for unified graph representation of skills and acumen in accordance with one or more of the various embodiments.

FIG. 13 illustrates a flowchart of process 1300 for unified graph representation of skills and acumen in accordance with one or more of the various embodiments. After a start block, at block 1302, in one or more of the various embodiments, profile information may be provided to a graph engine. As described above, ingestion engines, modeling engines, or the like, may collect data from various sources to provide profile information for one or more learners. In some embodiments, profile information may conform to a unified schema that 'normalizes' the collected data into a common schema.

At block 1304, in one or more of the various embodiments, graph engines may be arranged to determine one or more map models. In one or more of the various embodiments, different map models may be provided for different types of profiles. Likewise, in some embodiments, different map models may be provided for different organizations. For example, a first organization may require additional information to be included in profile graphs than other organizations. Likewise, for example, different organizations may require different post-processing (e.g., formatting, localizations, or the like) of information or attributes values that may be included in profile graphs.

Accordingly, in some embodiments, graph engines may be arranged to associated one or more map models with various profile types, learner types, organizations, or the like, based on configuration information to account for local requirements or local circumstances.

At block 1306, in one or more of the various embodiments, graph engines may be arranged to classify one or more facts, actions, or skills from the profile information. In one or more of the various embodiments, map models may include one or more directives, pattern-matching-rules, regular expressions, or the like, that graph engines may employ to classify one or more fields/records in the profile information as a fact, an action, a skill, or the like.

At block 1308, in one or more of the various embodiments, graph engines may be arranged to generate one or more nodes for the determined facts or skills. In one or more of the various embodiments, nodes in profile graphs may represent facts or skills. Accordingly, in some embodiments, map models may declare one or more labels, attributes, tags, or the like, that may be associated with fact nodes or skill nodes. In some embodiments, graph engines may be arranged to associate links or references to source data associated with the one or more nodes.

At block 1310, in one or more of the various embodiments, graph engines may be arranged to generate one or more edges for one or more fact-relationships, skill-relationships, or skill actions. In one or more of the various embodiments, map models may include one or more directives, pattern-matching-rules, regular expressions, or the like, that graph engines may employ to determine if one or more fields/records in the profile information may be classified as a fact-relationship, an action, or a skill-relationship. In some embodiments, graph engines may be arranged to determine one or more relationships directly from the unified schema. For example, unified schema may define explicitly define relationships between facts, skills, or the like.

At decision block 1312, in one or more of the various embodiments, if there are more facts, fact-relationships, actions, or skills, control may loop back to block 1306; otherwise, control may flow to block 1314.

At block 1314, in one or more of the various embodiments, graph engines may be arranged to provide one or more profile graphs. In one or more of the various embodiments, profile graphs may be stored in a data stores that may be made accessible to one or more analysis applications.

Next, in one or more of the various embodiments, control may be returned to a calling process.

Figure 14:
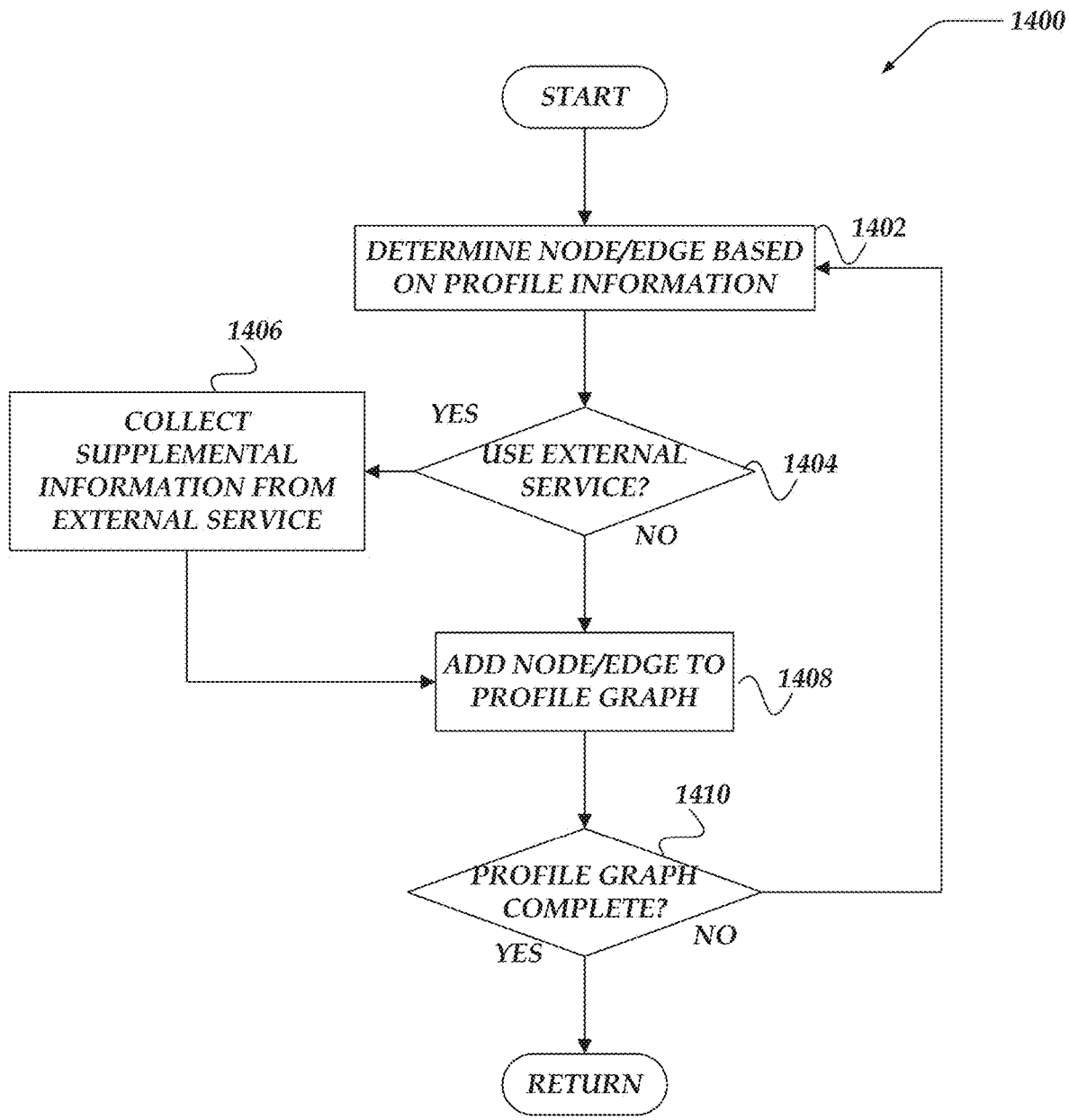
FIG. 14 illustrates a flowchart of a process for unified graph representation of skills and acumen in accordance with one or more of the various embodiments.

FIG. 14 illustrates a flowchart of process 1400 for unified graph representation of skills and acumen in accordance with one or more of the various embodiments. After a start block, at block 1402, in one or more of the various embodiments, graph engines may be arranged to determine nodes or edges based on profile information. As described above, profile information for learners, roles, alumni, or the like, may be stored in one or more data stores based on a unified scheme. Accordingly, in some embodiments, graph engines may be arranged to have access to the profile information via one or more APIs. These APIs may include interfaces for passing query information to the data stores that store the profile information.

As described above, in some embodiments, graph engines may be arranged to iterate over the profile information to determine fact, fact-relationships, actions, skills, skill-relationships, or the like.

At decision block 1404, in one or more of the various embodiments, if external services may be reference in map models, control may flow to block 1406; otherwise, control flow to block 1408.

As described above, map models may include rules for mapping profile information to nodes and edges of profile graphs. In some cases, for some embodiments, map models may declare that one or more edge types or one or more node types may be associated with values provided or derived from one or more external services.

At block 1406, in one or more of the various embodiments, graph engines may be arranged to collect supplemental information from the external service.

In some embodiments, map models may include or reference APIs, URIs, or the like, that enable graph engines to obtain the information from external services that may enable the values to be determined.

In some cases, for some embodiments, external services may be processes that may reformat portions (e.g., fields) of the profile information. Also, in some embodiments, external services may be processes that combined external information with profile information or combine one or more profile information fields into one field value.

In one or more of the various embodiments, map models may declare one or more fields to values that may be used to supplement or extend information included in the profile information.

At block 1408, in one or more of the various embodiments, graph engines may be arranged to add the node or edge to a profile graph. In one or more of the various embodiments, nodes and edges in profile graphs may comprise data structures that enable one or more attribute values to be associated with individual nodes or individual edges.

At decision block 1410, in one or more of the various embodiments, if the profile graph may be complete, control may be returned to a calling process; otherwise, control may loop back to block 1402.

Figure 15:
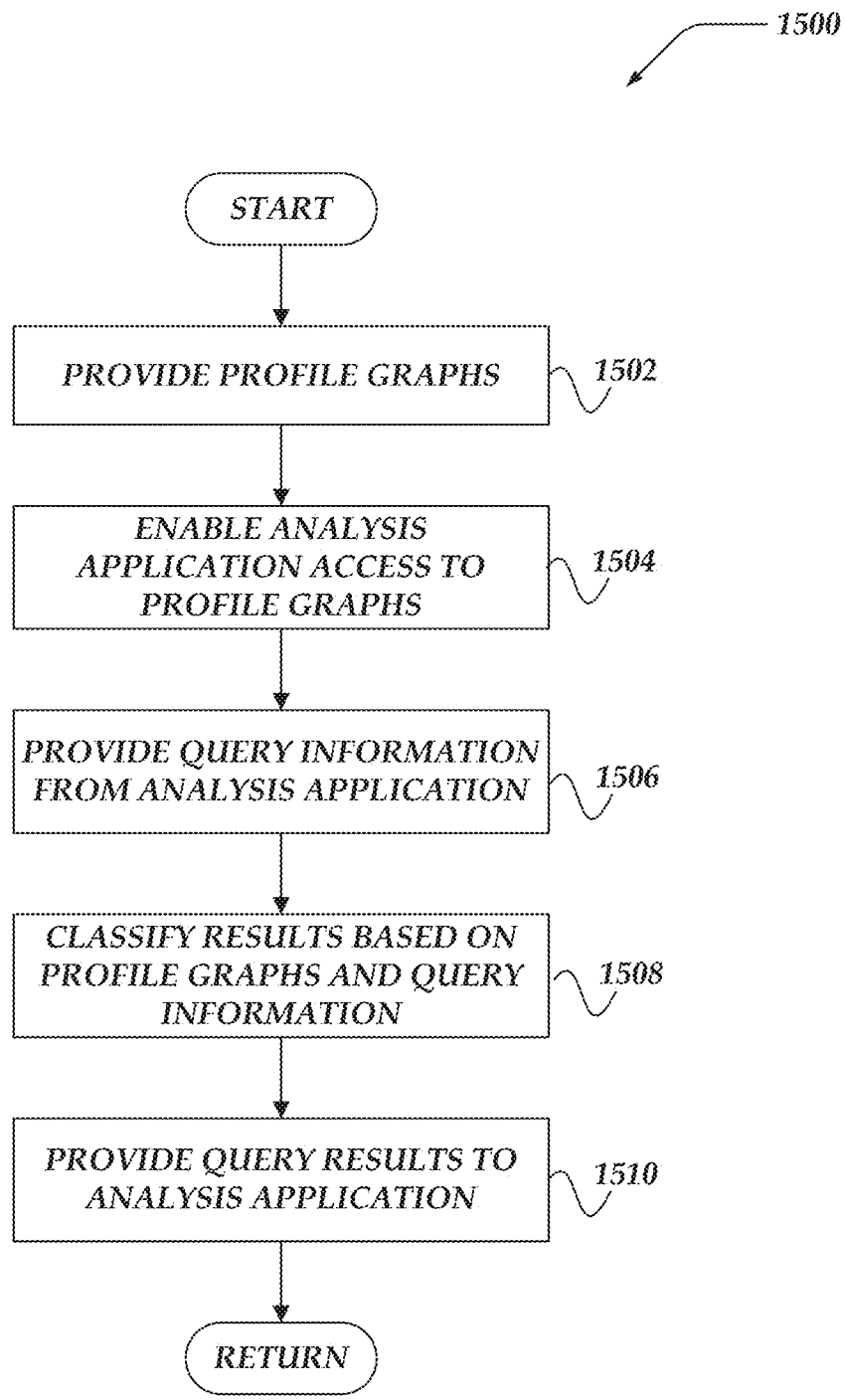
FIG. 15 illustrates a flowchart of a process for unified graph representation of skills and acumen in accordance with one or more of the various embodiments.

FIG. 15 illustrates a flowchart of process 1500 for unified graph representation of skills and acumen in accordance with one or more of the various embodiments. After a start block, at block 1502, in one or more of the various embodiments, as described above, graph engines may be arranged to provide a plurality of profile graphs based on profile information and one or more map models.

At block 1504, in one or more of the various embodiments, graph engines may be arranged to enable one or more analysis applications to access the some or all of the plurality of profile graphs. In some embodiments, graph engines may be arranged to provide one or more APIs that enable other applications or services to access profile graphs. In some embodiments, the one or more APIs may enable analysis applications to indirectly or directly provide query information. In this case, indirectly provided query information may be provided for APIs that may be dedicated to a specific reports or analysis operations. For example, an API designed for identifying learners domiciled within a given distance may be designed to accept parameters such as location and max-distance. In contrast, directly provided query information may be provided via APIs that accept one or more query language expressions as inputs. For example, an APIs that accepted query expression in graphQL or graphQL-like format may be considered an API that directly accepts query information.

In one or more of the various embodiments, graph engines may be arranged to support one or more query languages. In some embodiments, graph engines may be arranged to support one or more plug-ins, extensions, or the like, that enable support for additional query languages or query language features. Also, in some embodiments, graph engines may be arranged to enable users to supply one or more stored procedures, or the like, that may be employed.

In one or more of the various embodiments, graph engines may be arranged to store profile graphs in a separate data store (or database) that may provide APIs for querying profile graphs. Accordingly, in some embodiments, one or more analysis applications may connect with the profile graph data store directly rather than interfacing through a graph engine.

At block 1506, in one or more of the various embodiments, the one or more analysis applications may provide query information to graph engines.

In some embodiments, analysis applications may employ one or more direct APIs to submit one or more query language expressions to graph engines. Also, in some embodiments, analysis applications may employ one or more indirect APIs that result in the graph engines generating query information to determine the results for the specific 'question' associated with the indirect APIs.

In some embodiments, graph engines may be arranged to evaluate the query information for correctness using one or more parsers, grammar-checkers, or the like. Also, in some embodiments, graph engines may be arranged to confirm that the analysis applications associated with the query information may have the rights or privileges to access the profile graphs that may be associated with the query information.

In one or more of the various embodiments, graph engines may be arranged to employ one or more grammars, parsers, or the like, provided via configuration information. Thus, in some embodiments, graph engines may be arranged to support more than one query language.

In one or more of the various embodiments, if a graph engine may be unable to confirm that the provided query information is correct or otherwise valid, the query information may be rejected and an error response may be returned to the associated analysis applications.

At block 1508, in one or more of the various embodiments, graph engines may be arranged to classify results based on some or all of the plurality of profile graphs and the query information. In some embodiments, one or more portions of the of the plurality of profile graphs may be classified into profile graph segments, aggregate results, or the like, based on the query information.

At block 1510, in one or more of the various embodiments, graph engines may be arranged to provide the query results to the analysis application that provided the query information.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data over a network, wherein one or more processors are configured to execute instructions that cause performance of the method, comprising:

classifying ingested information associated with one or more subjects to provide profile information that conforms to a unified schema;

classifying one or more fields of the profile information as one or more facts, one or more fact-relationships, one or more actions, one or more skills, or one or more skill-relationships based on the unified schema;

generating a plurality of profile graphs based on one or more map models and the one or more facts, the one or more fact-relationships, the one or more actions, the one or more skills, or the one or more skill-relationships, wherein the one or more map models are determined based on a profile type, a subject, and an organization, wherein the one or more map models include one or more directives for associating the one or more facts, the one or more fact-relationships, the one or more actions, the one or more skills, or the one or more skill-relationships with one or more nodes or one or more edges in the plurality of profile graphs, and wherein one or more supplemental services provide supplemental information, separate from the profile information provided by the ingested information, that is employed to post process a format and a localization requirement for the organization that are used to customize directives of the one or more map models to support one or more of local requirements or local circumstances; and in response to query information provided by one or more analysis applications, performing further actions, including:

classifying a portion of the plurality of profile graphs based on the query information, wherein the portion corresponds to one or more nodes or one or more edges that match one or more expressions in the query information; and providing the classified portion of the plurality of profile graphs to one or more of an analysis application or in a report for a user.

2. The method of claim 1, further comprising:
in response to providing new profile information, performing further actions including:
classifying new profile information based on the unified schema;
updating the portion of the plurality of profile graphs based on the new classified profile information; and
generating one or more new profile graphs based on the new profile information.

3. The method of claim 1, wherein generating the plurality of profile graphs, further comprises:
associating each of the one or more facts with a node in one or more profile graphs based on the one or more map models and the unified schema; and
associating each of the one or more fact-relationships with an edge in the one or more profile graphs based on the one or more map models and the unified schema, wherein each edge connects two or more fact nodes based on a relationship between the two or more facts.

4. The method of claim 1, wherein generating the plurality of profile graphs, further comprises:
associating each of the one or more skills with a node in one or more profile graphs based on the one or more map models and the unified schema; and
associating each of the one or more actions with an edge in the one or more profile graphs based on the one or more map models and the unified schema, wherein the edge corresponds to one or more activities that resulted in a skill being associated with a subject.

5. The method of claim 1, wherein generating the plurality of profile graphs, further comprises:
associating each of the one or more skills with a node in one or more profile graphs based on the one or more map models and the unified schema; and
associating each of the one or more skill-relationships with an edge in the one or more profile graphs based on the one or more map models and the unified schema, wherein the edge associates one or more other skills with a skill associated with a subject based on the subject's completion of an action.

6. The method of claim 1, wherein generating the plurality of profile graphs, further comprises:
determining one or more attributes associated with one or more external services based on the one or more map models;
providing one or more values for the one or more attributes based on the one or more external services, wherein the one or more values are separate from the profile information; and
associating the one or more attribute values with one or more of a node or an edge in the plurality of profile graphs based on the one or more map models.

7. A network computer for managing data over a network, comprising:
a memory that stores at least instructions; and
one or more processors that execute instructions that are configured to cause performance of actions, including:
classifying ingested information associated with one or more subjects to provide profile information that conforms to a unified schema;
classifying one or more fields of the profile information as one or more facts, one or more fact-relationships, one or more actions, one or more skills, or one or more skill-relationships based on the unified schema;
generating a plurality of profile graphs based on one or more map models and the one or more facts, the one or more fact-relationships, the one or more actions, the one or more skills, or the one or more skill-relationships, wherein the one or more map models are determined based on a profile type, a subject, and an organization, wherein the one or more map models include one or more directives for associating the one or more facts, the one or more fact-relationships, the one or more actions, the one or more skills, or the one or more skill-relationships with one or more nodes or one or more edges in the plurality of profile graphs, and wherein one or more supplemental services provide supplemental information, separate from the profile information provided by the ingested information, that is employed to post process a format and a localization requirement for the organization that are used to customize directives of the one or more map models to support one or more of local requirements or local circumstances; and
in response to query information provided by one or more analysis applications, performing further actions, including:
classifying a portion of the plurality of profile graphs based on the query information, wherein the portion corresponds to one or more nodes or one or more edges that match one or more expressions in the query information; and
providing the classified portion of the plurality of profile graphs to one or more of an analysis application or in a report for a user.

8. The network computer of claim 7, wherein the one or more processors execute instructions that perform actions:
in response to providing new profile information, performing further actions including:
classifying new profile information based on the unified schema;
updating the portion of the plurality of profile graphs based on the new classified profile information; and
generating one or more new profile graphs based on the new profile information.

9. The network computer of claim 7, wherein generating the plurality of profile graphs, further comprises:
associating each of the one or more facts with a node in one or more profile graphs based on the one or more map models and the unified schema; and
associating each of the one or more fact-relationships with an edge in the one or more profile graphs based on the one or more map models and the unified schema, wherein each edge connects two or more fact nodes based on a relationship between the two or more facts.

10. The network computer of claim 7, wherein generating the plurality of profile graphs, further comprises:
associating each of the one or more skills with a node in one or more profile graphs based on the one or more map models and the unified schema; and
associating each of the one or more actions with an edge in the one or more profile graphs based on the one or more map models and the unified schema, wherein the edge corresponds to one or more activities that resulted in a skill being associated with a subject.

11. The network computer of claim 7, wherein generating the plurality of profile graphs, further comprises:
associating each of the one or more skills with a node in one or more profile graphs based on the one or more map models and the unified schema; and
associating each of the one or more skill-relationships with an edge in the one or more profile graphs based on the one or more map models and the unified schema, wherein the edge associates one or more other skills with a skill associated with a subject based on the subject's completion of an action.

12. The network computer of claim 7, wherein generating the plurality of profile graphs, further comprises:
determining one or more attributes associated with one or more external services based on the one or more map models;
providing one or more values for the one or more attributes based on the one or more external services, wherein the one or more values are separate from the profile information; and
associating the one or more attribute values with one or more of a node or an edge in the plurality of profile graphs based on the one or more map models.

13. A processor readable non-transitory storage media that includes instructions for managing data over a network, wherein execution of the instructions, by one or more processors, are configured to cause performance of actions, comprising:
classifying ingested information associated with one or more subjects to provide profile information that conforms to a unified schema;
classifying one or more fields of the profile information as one or more facts, one or more fact-relationships, one or more actions, one or more skills, or one or more skill-relationships based on the unified schema;
generating a plurality of profile graphs based on one or more map models and the one or more facts, the one or more fact-relationships, the one or more actions, the one or more skills, or the one or more skill-relationships, wherein the one or more map models are determined based on a profile type, a subject, and an organization, wherein the one or more map models include one or more directives for associating the one or more facts, the one or more fact-relationships, the one or more actions, the one or more skills, or the one or more skill-relationships with one or more nodes or one or more edges in the plurality of profile graphs, and wherein one or more supplemental services provide supplemental information, separate from the profile information provided by the ingested information, that is employed to post process a format and a localization requirement for the organization that are used to customize directives of the one or more map models to support one or more of local requirements or local circumstances; and
in response to query information provided by one or more analysis applications, performing further actions, including:
classifying a portion of the plurality of profile graphs based on the query information, wherein the portion corresponds to one or more nodes or one or more edges that match one or more expressions in the query information; and
providing the classified portion of the plurality of profile graphs to one or more of an analysis application or in a report for a user.

14. The media of claim 13, further comprising:
in response to providing new profile information, performing further actions including:
classifying new profile information based on the unified schema;
updating the portion of the plurality of profile graphs based on the new classified profile information; and
generating one or more new profile graphs based on the new profile information.

15. The media of claim 13, wherein generating the plurality of profile graphs, further comprises:
associating each of the one or more facts with a node in one or more profile graphs based on the one or more map models and the unified schema; and
associating each of the one or more fact-relationships with an edge in the one or more profile graphs based on the one or more map models and the unified schema, wherein each edge connects two or more fact nodes based on a relationship between the two or more facts.

16. The media of claim 13, wherein generating the plurality of profile graphs, further comprises:
associating each of the one or more skills with a node in one or more profile graphs based on the one or more map models and the unified schema; and
associating each of the one or more actions with an edge in the one or more profile graphs based on the one or more map models and the unified schema, wherein the edge corresponds to one or more activities that resulted in a skill being associated with a subject.

17. The media of claim 13, wherein generating the plurality of profile graphs, further comprises:
associating each of the one or more skills with a node in one or more profile graphs based on the one or more map models and the unified schema; and
associating each of the one or more skill-relationships with an edge in the one or more profile graphs based on the one or more map models and the unified schema, wherein the edge associates one or more other skills with a skill associated with a subject based on the subject's completion of an action.

18. The media of claim 13, wherein generating the plurality of profile graphs, further comprises:
determining one or more attributes associated with one or more external services based on the one or more map models;
providing one or more values for the one or more attributes based on the one or more external services, wherein the one or more values are separate from the profile information; and
associating the one or more attribute values with one or more of a node or an edge in the plurality of profile graphs based on the one or more map models.

19. A system for managing data, comprising:
a network computer, comprising:
a memory that stores at least instructions; and
one or more processors that execute instructions that are configured to cause performance of actions, including:
classifying ingested information associated with one or more subjects to provide profile information that conforms to a unified schema;
classifying one or more fields of the profile information as one or more facts, one or more fact-relationships, one or more actions, one or more skills, or one or more skill-relationships based on the unified schema;

generating a plurality of profile graphs based on one or more map models and the one or more facts, the one or more fact-relationships, the one or more actions, the one or more skills, or the one or more skill-relationships, wherein the one or more map models are determined based on a profile type, a subject, and an organization, wherein the one or more map models include one or more directives for associating the one or more facts, the one or more fact-relationships, the one or more actions, the one or more skills, or the one or more skill-relationships with one or more nodes or one or more edges in the plurality of profile graphs, and wherein one or more supplemental services provide supplemental information, separate from the profile information provided by the ingested information, that is employed to post process a format and a localization requirement for the organization that are used to customize directives of the one or more map models to support one or more of local requirements or local circumstances; and in response to query information provided by one or more analysis applications, performing further actions, including:

classifying a portion of the plurality of profile graphs based on the query information, wherein the portion corresponds to one or more nodes or one or more edges that match one or more expressions in the query information; and providing the classified portion of the plurality of profile graphs to one or more of an analysis application or in one or more reports for a user; and a client computer, comprising:

a memory that stores at least instructions; and one or more processors that execute instructions that are configured to cause performance of actions, including:

displaying the one or more reports on a hardware display or hosting the one or more analysis applications.

20. The system of claim 19, wherein the one or more network computer processors execute instructions that perform actions, further comprising:

in response to providing new profile information, performing further actions including:

classifying new profile information based on the unified schema;

updating the portion of the plurality of profile graphs based on the new classified profile information; and generating one or more new profile graphs based on the new profile information.

21. The system of claim 19, wherein generating the plurality of profile graphs, further comprises:

associating each of the one or more facts with a node in one or more profile graphs based on the one or more map models and the unified schema; and associating each of the one or more fact-relationships with an edge in the one or more profile graphs based on the one or more map models and the unified schema, wherein each edge connects two or more fact nodes based on a relationship between the two or more facts.

22. The system of claim 19, wherein generating the plurality of profile graphs, further comprises:

associating each of the one or more skills with a node in one or more profile graphs based on the one or more map models and the unified schema; and associating each of the one or more actions with an edge in the one or more profile graphs based on the one or more map models and the unified schema, wherein the edge corresponds to one or more activities that resulted in a skill being associated with a subject.

23. The system of claim 19, wherein generating the plurality of profile graphs, further comprises:

associating each of the one or more skills with a node in one or more profile graphs based on the one or more map models and the unified schema; and associating each of the one or more skill-relationships with an edge in the one or more profile graphs based on the one or more map models and the unified schema, wherein the edge associates one or more other skills with a skill associated with a subject based on the subject's completion of an action.

24. The system of claim 19, wherein generating the plurality of profile graphs, further comprises:

determining one or more attributes associated with one or more external services based on the one or more map models;

providing one or more values for the one or more attributes based on the one or more external services, wherein the one or more values are separate from the profile information; and associating the one or more attribute values with one or more of a node or an edge in the plurality of profile graphs based on the one or more map models.

* * * * *